United States Patent
Bedadala et al.

(10) Patent No.: US 11,449,394 B2
(45) Date of Patent: *Sep. 20, 2022

(54) FAILOVER SYSTEMS AND METHODS FOR PERFORMING BACKUP OPERATIONS, INCLUDING HETEROGENEOUS INDEXING AND LOAD BALANCING OF BACKUP AND INDEXING RESOURCES

(71) Applicant: Commvault Systems, Inc., Tinton Falls, NJ (US)

(72) Inventors: Pavan Kumar Reddy Bedadala, Piscataway, NJ (US); Parag Gokhale, Marlboro, NJ (US); Pavlo Mazur, Tinton Falls, NJ (US); Prakash Varadharajan, Morganville, NJ (US); Ankur Varshney, Tinton Falls, NJ (US); Gopikannan Venugopalsamy, Sunnyvale, CA (US); Marcelo Dos Reis Mansano, Paraná (BR)

(73) Assignee: Commvault Systems, Inc., Tinton Falls, NJ (US)

( * ) Notice: Subject to any disclaimer, the term of this patent is extended or adjusted under 35 U.S.C. 154(b) by 196 days.

This patent is subject to a terminal disclaimer.

(21) Appl. No.: 16/685,326

(22) Filed: Nov. 15, 2019

(65) Prior Publication Data

US 2020/0159627 A1 May 21, 2020

Related U.S. Application Data

(63) Continuation-in-part of application No. 15/684,410, filed on Aug. 23, 2017, now Pat. No. 10,534,673,
(Continued)

(51) Int. Cl.
*G06F 16/00* (2019.01)
*G06F 11/00* (2006.01)
(Continued)

(52) U.S. Cl.
CPC ...... *G06F 11/1464* (2013.01); *G06F 11/1446* (2013.01); *G06F 11/1451* (2013.01);
(Continued)

(58) Field of Classification Search
CPC ............ G06F 11/1458; G06F 11/2058; G06F 11/2023; G06F 11/1471; G06F 11/1466;
(Continued)

(56) References Cited

U.S. PATENT DOCUMENTS 4,084,231 A  4/1978 Capozzi et al.
4,267,568 A  5/1981 Dechant et al.
(Continued)

FOREIGN PATENT DOCUMENTS

AU    2004227949    10/2004
CA    2498174    3/2004
(Continued)

OTHER PUBLICATIONS

Qinghua Zou et al., "Ctree: A Compact Tree for Indexing XML Data", WIDM '04: Proceedings of the 6th annual ACM international workshop on Web information and data management, Nov. 12-13, 2004, Washington, DC, USA, pp. 39-46.*
(Continued)

*Primary Examiner* — Srirama Channavajjala
(74) *Attorney, Agent, or Firm* — Commvault Systems, Inc.

(57) ABSTRACT

Indexing preferences generally associate each data source with a type of indexing technology and/or with an index/catalog and/or with a computing device that hosts the index/catalog for tracking backup data generated from the source data. Indexing preferences govern which index/catalog receives transaction logs for a given storage operation. Thus, indexing destinations are defined granularly and flexibly in reference to the source data. Load balancing without
(Continued)

user intervention assures that the various index/catalogs are fairly distributed in the illustrative backup systems by autonomously initiating migration jobs. Criteria for initiating migration jobs are based on past usage and going-forward trends. An illustrative migration job re-associates data sources with a different destination media agent and/or index/catalog, including transferring some or all relevant transaction logs and/or indexing information from the old host to the new host.

19 Claims, 11 Drawing Sheets

Related U.S. Application Data which is a continuation of application No. 14/675,524, filed on Mar. 31, 2015, now abandoned, which is a continuation of application No. 13/958,353, filed on Aug. 2, 2013, now Pat. No. 9,026,497, which is a continuation of application No. 12/982,165, filed on Dec. 30, 2010, now Pat. No. 8,504,526.

(60) Provisional application No. 62/811,424, filed on Feb. 27, 2019, provisional application No. 61/351,790, filed on Jun. 4, 2010.

(51) Int. Cl.
| | | |
|---|---|---|
| *G06F 11/14* | (2006.01) | |
| *G06F 11/20* | (2006.01) | |
| *G06F 16/11* | (2019.01) | |
| *G06F 16/21* | (2019.01) | |
| *G06F 16/10* | (2019.01) | |
| *H04L 41/08* | (2022.01) | |

(52) U.S. Cl.
CPC ...... *G06F 11/1466* (2013.01); *G06F 11/1471* (2013.01); *G06F 11/2023* (2013.01); *G06F 16/10* (2019.01); *G06F 16/113* (2019.01); *G06F 16/21* (2019.01); *H04L 41/08* (2013.01)

(58) Field of Classification Search
CPC ............. G06F 11/1451; G06F 11/1446; G06F 11/1464; G06F 16/113; G06F 16/2358; G06F 16/31; G06F 16/10; H04L 41/08
See application file for complete search history.

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,420,996 A | 5/1995 | Aoyagi |
| 5,448,724 A | 9/1995 | Hayashi |
| 5,454,099 A | 9/1995 | Myers et al. |
| 5,481,694 A * | 1/1996 | Chao ............... G06F 3/0601 711/112 |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,544,359 A | 8/1996 | Tada et al. |
| 5,548,750 A | 8/1996 | Larsson et al. |
| 5,559,957 A | 9/1996 | Balk |
| 5,559,991 A | 9/1996 | Kanfi |
| 5,594,901 A | 1/1997 | Andoh |
| 5,619,644 A | 4/1997 | Crockett et al. |
| 5,638,509 A | 6/1997 | Dunphy et al. |
| 5,640,561 A | 6/1997 | Satoh et al. |
| 5,642,496 A | 6/1997 | Kanfi |
| 5,664,204 A | 9/1997 | Wang |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,793,867 A | 8/1998 | Cordery et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,930,831 A | 7/1999 | Marsh et al. |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem |
| 6,078,932 A | 6/2000 | Haye et al. |
| 6,094,416 A | 7/2000 | Ying |
| 6,101,585 A | 8/2000 | Brown et al. |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,175,904 B1 | 1/2001 | Gunderson |
| 6,185,474 B1 | 2/2001 | Nakamura et al. |
| 6,199,074 B1 * | 3/2001 | Kern ............... G06F 11/2058 |
| 6,212,512 B1 | 4/2001 | Barney et al. |
| 6,230,166 B1 | 5/2001 | Velamuri et al. |
| 6,260,069 B1 | 7/2001 | Anglin |
| 6,269,431 B1 | 7/2001 | Dunham |
| 6,272,631 B1 | 8/2001 | Thomlinson et al. |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,397,242 B1 | 5/2002 | Devine et al. |
| 6,415,323 B1 | 7/2002 | McCanne et al. |
| 6,418,478 B1 | 7/2002 | Ignatius et al. |
| 6,421,711 B1 | 7/2002 | Blumenau et al. |
| 6,487,561 B1 | 11/2002 | Ofek et al. |
| 6,516,327 B1 | 2/2003 | Zondervan et al. |
| 6,519,679 B2 | 2/2003 | Devireddy et al. |

(56) References Cited

U.S. PATENT DOCUMENTS

| | | |
|---|---|---|
| 6,538,669 B1 | 3/2003 | Lagueux, Jr. |
| 6,542,972 B2 | 4/2003 | Ignatius et al. |
| 6,564,228 B1 | 5/2003 | O'Connor |
| 6,581,076 B1 | 6/2003 | Ching et al. |
| 6,658,436 B2 | 12/2003 | Oshinsky et al. |
| 6,658,526 B2 | 12/2003 | Nguyen et al. |
| 6,704,839 B2 | 3/2004 | Butterworth et al. |
| 6,704,885 B1* | 3/2004 | Salas-Meza ........ G06F 11/1461 707/999.202 |
| 6,721,767 B2 | 4/2004 | De Meno et al. |
| 6,732,124 B1 | 5/2004 | Koseki et al. |
| 6,760,723 B2 | 7/2004 | Oshinsky et al. |
| 6,769,003 B2 | 7/2004 | Park et al. |
| 6,772,290 B1 | 8/2004 | Bromley et al. |
| 6,795,904 B1 | 9/2004 | Kamvysselis |
| 6,820,214 B1 | 11/2004 | Cabrera et al. |
| 6,836,830 B1* | 12/2004 | Yamagami .......... G06F 11/1456 707/999.202 |
| 6,839,747 B1 | 1/2005 | Blumenau et al. |
| 6,880,101 B2 | 4/2005 | Golasky et al. |
| 7,003,641 B2 | 2/2006 | Prahlad et al. |
| 7,035,880 B1 | 4/2006 | Crescenti et al. |
| 7,065,537 B2 | 6/2006 | Cha et al. |
| 7,076,270 B2 | 7/2006 | Jaggers et al. |
| 7,082,464 B2 | 7/2006 | Hasan et al. |
| 7,100,007 B2* | 8/2006 | Saika ................. G06F 11/1451 709/218 |
| 7,103,432 B2 | 9/2006 | Drader et al. |
| 7,107,298 B2 | 9/2006 | Prahlad et al. |
| 7,130,970 B2 | 10/2006 | Devassy et al. |
| 7,143,121 B2 | 11/2006 | Mendonca et al. |
| 7,162,496 B2 | 1/2007 | Amarendran et al. |
| 7,174,433 B2 | 2/2007 | Kottomtharayil et al. |
| 7,178,059 B2 | 2/2007 | Greenspan et al. |
| 7,209,972 B1 | 4/2007 | Ignatius et al. |
| 7,219,162 B2 | 5/2007 | Donker et al. |
| 7,234,073 B1 | 6/2007 | Roytman et al. |
| 7,246,207 B2 | 7/2007 | Kottomtharayil et al. |
| 7,249,150 B1 | 7/2007 | Watanabe et al. |
| 7,315,923 B2 | 1/2008 | Retnamma et al. |
| 7,315,924 B2 | 1/2008 | Prahlad et al. |
| 7,318,134 B1 | 1/2008 | Oliveira et al. |
| 7,324,543 B2 | 1/2008 | Wassew et al. |
| 7,343,356 B2 | 3/2008 | Prahlad et al. |
| 7,343,453 B2 | 3/2008 | Prahlad et al. |
| 7,346,623 B2 | 3/2008 | Prahlad et al. |
| 7,346,751 B2 | 3/2008 | Prahlad et al. |
| 7,376,895 B2 | 5/2008 | Tsao |
| 7,380,072 B2 | 5/2008 | Kottomtharayil et al. |
| 7,380,155 B2* | 5/2008 | Fung ........................ H04L 1/22 707/999.202 |
| 7,383,293 B2 | 6/2008 | Gupta et al. |
| 7,386,744 B2 | 6/2008 | Barr et al. |
| 7,389,311 B1 | 6/2008 | Crescenti et al. |
| 7,395,282 B1 | 7/2008 | Crescenti et al. |
| 7,401,154 B2 | 7/2008 | Ignatius et al. |
| 7,409,509 B2 | 8/2008 | Devassy et al. |
| 7,424,519 B2 | 9/2008 | Hoshino et al. |
| 7,437,388 B1 | 10/2008 | DeVos |
| 7,440,982 B2 | 10/2008 | Lu et al. |
| 7,447,692 B2 | 11/2008 | Oshinsky et al. |
| 7,448,079 B2 | 11/2008 | Tremain |
| 7,454,569 B2 | 11/2008 | Kavuri et al. |
| 7,475,282 B2 | 1/2009 | Tormasov et al. |
| 7,484,054 B2 | 1/2009 | Kottomtharayil et al. |
| 7,484,208 B1 | 1/2009 | Nelson |
| 7,490,207 B2 | 2/2009 | Amarendran |
| 7,500,053 B1 | 3/2009 | Kavuri et al. |
| 7,502,820 B2 | 3/2009 | Manders et al. |
| 7,512,595 B1 | 3/2009 | McBride et al. |
| 7,529,782 B2 | 5/2009 | Prahlad et al. |
| 7,536,291 B1 | 5/2009 | Retnamma et al. |
| 7,539,707 B2 | 5/2009 | Prahlad et al. |
| 7,543,125 B2 | 6/2009 | Gokhale |
| 7,546,324 B2 | 6/2009 | Prahlad et al. |
| 7,546,484 B2* | 6/2009 | Sen ..................... G06F 11/1456 709/221 |
| 7,552,279 B1 | 6/2009 | Gandler |
| 7,568,080 B2 | 7/2009 | Prahlad et al. |
| 7,581,077 B2 | 8/2009 | Ignatius et al. |
| 7,594,138 B2 | 9/2009 | Abdulvahid |
| 7,596,721 B1 | 9/2009 | Flake et al. |
| 7,600,125 B1 | 10/2009 | Stringham |
| 7,603,386 B2 | 10/2009 | Amarendran et al. |
| 7,606,844 B2 | 10/2009 | Kottomtharayil |
| 7,613,748 B2 | 11/2009 | Brockway et al. |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,617,307 B2 | 11/2009 | Childress et al. |
| 7,620,710 B2 | 11/2009 | Kottomtharayil et al. |
| 7,631,351 B2 | 12/2009 | Erofeev |
| 7,636,743 B2 | 12/2009 | Erofeev |
| 7,640,406 B1 | 12/2009 | Hagerstrom et al. |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,668,884 B2 | 2/2010 | Prahlad et al. |
| 7,685,177 B1 | 3/2010 | Hagerstrom et al. |
| 7,694,070 B2 | 4/2010 | Mogi et al. |
| 7,702,782 B1 | 4/2010 | Pai |
| 7,707,184 B1 | 4/2010 | Zhang et al. |
| 7,707,190 B2 | 4/2010 | Yu et al. |
| 7,721,138 B1 | 5/2010 | Lyadvinsky et al. |
| 7,725,893 B2 | 5/2010 | Jaeckel et al. |
| 7,730,035 B2 | 6/2010 | Berger et al. |
| 7,734,578 B2 | 6/2010 | Prahlad et al. |
| 7,734,669 B2 | 6/2010 | Kottomtharayil et al. |
| 7,739,459 B2 | 6/2010 | Kottomtharayil et al. |
| 7,747,579 B2 | 6/2010 | Prahlad et al. |
| 7,756,835 B2 | 7/2010 | Pugh |
| 7,756,964 B2 | 7/2010 | Madison, Jr. et al. |
| 7,757,043 B2 | 7/2010 | Kavuri et al. |
| 7,765,167 B2 | 7/2010 | Prahlad et al. |
| 7,769,961 B2 | 8/2010 | Kottomtharayil et al. |
| 7,778,984 B2 | 8/2010 | Zhang et al. |
| 7,792,789 B2 | 9/2010 | Prahlad et al. |
| 7,793,307 B2 | 9/2010 | Gokhale et al. |
| 7,797,281 B1 | 9/2010 | Greene et al. |
| 7,801,864 B2 | 9/2010 | Prahlad et al. |
| 7,802,067 B2 | 9/2010 | Prahlad et al. |
| 7,809,914 B2 | 10/2010 | Kottomtharayil et al. |
| 7,822,717 B2 | 10/2010 | Kapoor et al. |
| 7,822,939 B1 | 10/2010 | Veprinsky et al. |
| 7,822,967 B2 | 10/2010 | Fung |
| 7,840,537 B2 | 11/2010 | Gokhale |
| 7,861,234 B1 | 12/2010 | Lolo |
| 7,882,077 B2 | 2/2011 | Gokhale et al. |
| 7,890,467 B2 | 2/2011 | Watanable et al. |
| 7,899,788 B2 | 3/2011 | Chandhok et al. |
| 7,917,617 B1 | 3/2011 | Ponnapur |
| 7,937,421 B2 | 5/2011 | Mikesell et al. |
| 7,937,612 B1 | 5/2011 | Lyadvinsky et al. |
| 8,001,277 B2 | 8/2011 | Mega et al. |
| 8,037,028 B2 | 10/2011 | Prahlad et al. |
| 8,037,032 B2 | 10/2011 | Pershin et al. |
| 8,046,550 B2 | 10/2011 | Feathergill |
| 8,051,473 B2 | 11/2011 | Szucs |
| 8,055,745 B2 | 11/2011 | Atluri |
| 8,060,476 B1 | 11/2011 | Afonso et al. |
| 8,069,271 B2 | 11/2011 | Brunet et al. |
| 8,099,391 B1 | 1/2012 | Monckton |
| 8,108,638 B2 | 1/2012 | Kishi |
| 8,108,640 B1 | 1/2012 | Holl, II |
| 8,117,492 B1 | 2/2012 | Searls et al. |
| 8,131,681 B1 | 3/2012 | Hangud et al. |
| 8,135,930 B1 | 3/2012 | Mattox et al. |
| 8,140,786 B2 | 3/2012 | Bunte |
| 8,156,086 B2 | 4/2012 | Lu et al. |
| 8,156,301 B1 | 4/2012 | Khandelwal et al. |
| 8,170,995 B2 | 5/2012 | Prahlad et al. |
| 8,185,777 B2 | 5/2012 | Davies et al. |
| 8,185,893 B2 | 5/2012 | Hyser et al. |

(56) References Cited

U.S. PATENT DOCUMENTS

| | | |
|---|---|---|
| 8,195,623 B2 | 6/2012 | Prahlad et al. |
| 8,199,911 B1 | 6/2012 | Tsaur et al. |
| 8,200,637 B1 | 6/2012 | Stringham |
| 8,204,859 B2 | 6/2012 | Ngo |
| 8,219,524 B2 | 7/2012 | Gokhale |
| 8,219,653 B1 | 7/2012 | Keagy et al. |
| 8,219,769 B1 | 7/2012 | Wilk |
| 8,225,133 B1 | 7/2012 | Lyadvinsky et al. |
| 8,229,896 B1 | 7/2012 | Narayanan |
| 8,229,954 B2 | 7/2012 | Kottomtharayil et al. |
| 8,230,195 B2 | 7/2012 | Amarendran et al. |
| 8,230,256 B1 | 7/2012 | Raut |
| 8,271,443 B1 | 9/2012 | Swift et al. |
| 8,285,681 B2 | 10/2012 | Prahlad et al. |
| 8,291,170 B1 | 10/2012 | Zhang et al. |
| 8,291,407 B2 | 10/2012 | Greenwood et al. |
| 8,307,177 B2 | 11/2012 | Prahlad et al. |
| 8,307,187 B2 | 11/2012 | Chawla et al. |
| 8,315,992 B1 | 11/2012 | Gipp et al. |
| 8,336,040 B2 | 12/2012 | Davidson et al. |
| 8,364,652 B2 | 1/2013 | Vijayan et al. |
| 8,370,542 B2 | 2/2013 | Lu et al. |
| 8,396,838 B2 | 3/2013 | Brockway |
| 8,407,190 B2 | 3/2013 | Prahlad |
| 8,433,679 B2 | 4/2013 | Crescenti |
| 8,433,682 B2 | 4/2013 | Ngo |
| 8,434,131 B2 | 4/2013 | Varadharajan |
| 8,438,347 B1 | 5/2013 | Tawri et al. |
| 8,453,145 B1 | 5/2013 | Naik |
| 8,473,594 B2 | 6/2013 | Astete et al. |
| 8,479,304 B1 | 7/2013 | Clifford |
| 8,489,676 B1 | 7/2013 | Chaplin et al. |
| 8,504,526 B2 | 8/2013 | Gokhale et al. |
| 8,560,788 B1 | 10/2013 | Sreedharan et al. |
| 8,577,845 B2 | 11/2013 | Nguyen et al. |
| 8,578,120 B2 | 11/2013 | Attarde et al. |
| 8,578,126 B1 | 11/2013 | Gaonkar et al. |
| 8,595,191 B2 | 11/2013 | Prahlad et al. |
| 8,620,870 B2 | 12/2013 | Dwarampudi et al. |
| 8,650,389 B1 | 2/2014 | Thornewell et al. |
| 8,667,171 B2 | 3/2014 | Guo et al. |
| 8,706,867 B2 | 4/2014 | Vijayan |
| 8,751,857 B2 | 6/2014 | Frenkel et al. |
| 8,776,043 B1 | 7/2014 | Thimsen et al. |
| 8,793,222 B1 | 7/2014 | Stringham |
| 8,799,431 B2 | 8/2014 | Pabari |
| 8,825,720 B1 | 9/2014 | Xie et al. |
| 8,831,202 B1 | 9/2014 | Abidogun et al. |
| 8,850,146 B1 | 9/2014 | Majumdar |
| 8,904,081 B1 | 12/2014 | Kulkarni |
| 8,909,980 B1 | 12/2014 | Lewis et al. |
| 8,924,967 B2 | 12/2014 | Nelson |
| 8,930,496 B2 | 1/2015 | Gokhale et al. |
| 8,930,543 B2 | 1/2015 | Ashok et al. |
| 8,938,481 B2 | 1/2015 | Kumarasamy et al. |
| 8,938,643 B1 | 1/2015 | Karmarkar et al. |
| 8,954,446 B2 | 2/2015 | Vijayan et al. |
| 8,954,796 B1 | 2/2015 | Cohen et al. |
| 8,959,299 B2 | 2/2015 | Ngo et al. |
| 8,966,318 B1 | 2/2015 | Shah |
| 9,020,895 B1 | 4/2015 | Rajashekar |
| 9,020,900 B2 | 4/2015 | Vijayan et al. |
| 9,020,987 B1 | 4/2015 | Nanda et al. |
| 9,021,459 B1 | 4/2015 | Qu |
| 9,026,497 B2 | 5/2015 | Gokhale et al. |
| 9,026,498 B2 | 5/2015 | Kumarasamy |
| 9,069,587 B2 | 6/2015 | Agarwal et al. |
| 9,098,457 B2 | 8/2015 | Towstopiat et al. |
| 9,098,495 B2 | 8/2015 | Gokhale |
| 9,116,633 B2 | 8/2015 | Sancheti et al. |
| 9,124,633 B1 | 9/2015 | Eizadi et al. |
| 9,141,529 B2 | 9/2015 | Klein et al. |
| 9,146,755 B2 | 9/2015 | Lassonde et al. |
| 9,213,706 B2 | 12/2015 | Long et al. |
| 9,223,597 B2 | 12/2015 | Deshpande et al. |
| 9,235,474 B1 | 1/2016 | Petri et al. |
| 9,235,582 B1 | 1/2016 | Madiraju Varadaraju et al. |
| 9,239,687 B2 | 1/2016 | Vijayan et al. |
| 9,239,762 B1 | 1/2016 | Gunda et al. |
| 9,244,777 B2 | 1/2016 | Boullery et al. |
| 9,246,996 B1 | 1/2016 | Brooker |
| 9,268,602 B2 | 2/2016 | Prahlad et al. |
| 9,280,378 B2 | 3/2016 | Shah |
| 9,280,430 B2 | 3/2016 | Sarfare et al. |
| 9,286,086 B2 | 3/2016 | Deshpande et al. |
| 9,286,110 B2 | 3/2016 | Mitkar et al. |
| 9,292,350 B1 | 3/2016 | Pendharkar et al. |
| 9,298,386 B2 | 3/2016 | Baldwin et al. |
| 9,298,715 B2 | 3/2016 | Kumarasamy et al. |
| 9,311,121 B2 | 4/2016 | Deshpande et al. |
| 9,311,248 B2 | 4/2016 | Wagner |
| 9,336,076 B2 | 5/2016 | Baldwin et al. |
| 9,342,537 B2 | 5/2016 | Kumarasamy et al. |
| 9,372,827 B2 | 6/2016 | Kumarasamy et al. |
| 9,378,035 B2 | 6/2016 | Kirpalani |
| 9,397,944 B2 | 7/2016 | Hobbs et al. |
| 9,405,763 B2 | 8/2016 | Prahlad et al. |
| 9,417,968 B2 | 8/2016 | Dornemann et al. |
| 9,424,136 B1 | 8/2016 | Teater et al. |
| 9,436,555 B2 | 9/2016 | Dornemann et al. |
| 9,444,811 B2 | 9/2016 | Nara et al. |
| 9,448,731 B2 | 9/2016 | Nallathambi et al. |
| 9,451,023 B2 | 9/2016 | Sancheti |
| 9,461,881 B2 | 10/2016 | Kumarasamy |
| 9,471,441 B1 | 10/2016 | Lyadvinsky et al. |
| 9,477,683 B2 | 10/2016 | Ghosh |
| 9,483,361 B2 | 11/2016 | Gokhale et al. |
| 9,483,362 B2 | 11/2016 | Gokhale et al. |
| 9,483,363 B2 | 11/2016 | Gokhale et al. |
| 9,483,364 B2 | 11/2016 | Gokhale et al. |
| 9,489,244 B2 | 11/2016 | Mitkar et al. |
| 9,495,251 B2 | 11/2016 | Kottomtharayil et al. |
| 9,495,370 B1 | 11/2016 | Chatterjee et al. |
| 9,495,404 B2 | 11/2016 | Kumarasamy et al. |
| 9,563,518 B2 | 2/2017 | Klose |
| 9,575,789 B1 | 2/2017 | Rangari et al. |
| 9,575,991 B2 | 2/2017 | Ghosh |
| 9,588,847 B1 | 3/2017 | Natanzon et al. |
| 9,588,972 B2 | 3/2017 | Dwarampudi et al. |
| 9,594,636 B2 | 3/2017 | Mortensen et al. |
| 9,606,745 B2 | 3/2017 | Satoyama et al. |
| 9,612,966 B2 | 4/2017 | Joshi et al. |
| 9,632,882 B2 | 4/2017 | Kumarasamy et al. |
| 9,633,033 B2 | 4/2017 | Vijayan et al. |
| 9,639,274 B2 | 5/2017 | Maranna et al. |
| 9,639,426 B2 | 5/2017 | Pawar et al. |
| 9,652,283 B2 | 5/2017 | Mitkar et al. |
| 9,684,535 B2 | 6/2017 | Deshpande et al. |
| 9,684,567 B2 | 6/2017 | Derk et al. |
| 9,703,584 B2 | 7/2017 | Kottomtharayil et al. |
| 9,710,465 B2 | 7/2017 | Dornemann et al. |
| 9,766,989 B2 | 7/2017 | Mitkar et al. |
| 9,740,702 B2 | 8/2017 | Pawar et al. |
| 9,760,398 B1 | 9/2017 | Pai |
| 9,760,448 B1 | 9/2017 | Per et al. |
| 9,766,825 B2 | 9/2017 | Bhagi et al. |
| 9,811,427 B2 | 11/2017 | Klose |
| 9,823,977 B2 | 11/2017 | Dornemann et al. |
| 9,852,026 B2 | 12/2017 | Mitkar et al. |
| 9,886,346 B2 | 2/2018 | Kumarasamy et al. |
| 9,892,276 B2 | 2/2018 | Bell et al. |
| 9,898,213 B2 | 2/2018 | Joshi et al. |
| 9,928,001 B2 | 3/2018 | Dornemann et al. |
| 9,939,981 B2 | 4/2018 | White et al. |
| 9,965,306 B1 | 5/2018 | Natanzon |
| 9,965,316 B2 | 5/2018 | Deshpande et al. |
| 9,977,687 B2 | 5/2018 | Kottomtharayil et al. |
| 9,983,936 B2 | 5/2018 | Dornemann et al. |
| 9,990,253 B1 | 6/2018 | Rajimwale et al. |
| 9,996,287 B2 | 6/2018 | Dornemann et al. |
| 9,996,534 B2 | 6/2018 | Dornemann et al. |
| 10,001,935 B2 | 6/2018 | Gokhale et al. |
| 10,013,314 B2 | 7/2018 | Klose |
| 10,048,889 B2 | 8/2018 | Dornemann et al. |

(56) References Cited

U.S. PATENT DOCUMENTS

| | | |
|---|---|---|
| 10,061,658 B2 | 8/2018 | Long et al. |
| 10,061,663 B2 | 8/2018 | Vijayan et al. |
| 10,073,649 B2 | 9/2018 | DeJong et al. |
| 10,084,873 B2 | 9/2018 | Dornemann et al. |
| 10,108,652 B2 | 10/2018 | Kumarasamy et al. |
| 10,146,643 B2 | 12/2018 | Fang et al. |
| 10,152,251 B2 | 12/2018 | Sancheti et al. |
| 10,162,528 B2 | 12/2018 | Sancheti et al. |
| 10,162,873 B2 | 12/2018 | Desphande et al. |
| 10,191,816 B2 | 1/2019 | Vijayan et al. |
| 10,228,962 B2 | 3/2019 | Dornemann et al. |
| 10,229,133 B2 | 3/2019 | Vijayan et al. |
| 10,255,143 B2 | 4/2019 | Vijayan et al. |
| 10,365,839 B2 | 7/2019 | Gokhale et al. |
| 10,379,892 B2 | 8/2019 | Kripalani |
| 10,380,072 B2 | 8/2019 | Attarde et al. |
| 10,387,073 B2 | 8/2019 | Bhagi et al. |
| 10,387,269 B2 | 8/2019 | Muller et al. |
| 10,417,102 B2 | 9/2019 | Sanakkayala et al. |
| 10,437,505 B2 | 10/2019 | Dornemann et al. |
| 10,452,303 B2 | 10/2019 | Dornemann et al. |
| 10,474,483 B2 | 11/2019 | Kottomtharayil et al. |
| 10,474,542 B2 | 11/2019 | Mitkar et al. |
| 10,474,548 B2 | 11/2019 | Sanakkayala et al. |
| 10,474,638 B2 | 11/2019 | Mitkar et al. |
| 10,481,826 B2 | 11/2019 | Vijayan et al. |
| 10,481,984 B1 | 11/2019 | Semyonov et al. |
| 10,496,547 B1 | 12/2019 | Naenko |
| 10,503,619 B2 | 12/2019 | Kremane |
| 10,503,753 B2 | 12/2019 | Mitkar et al. |
| 10,534,672 B2 | 1/2020 | Klose |
| 10,534,673 B2 | 1/2020 | Gokhale et al. |
| 10,540,327 B2 | 1/2020 | Ngo et al. |
| 10,565,067 B2 | 2/2020 | Dornemann |
| 10,572,468 B2 | 2/2020 | Dornemann et al. |
| 10,592,145 B2 | 3/2020 | Bedadala et al. |
| 10,592,350 B2 | 3/2020 | Dornemann |
| 10,592,357 B2 | 3/2020 | Vijayan et al. |
| 10,628,267 B2 | 4/2020 | Prahlad et al. |
| 10,650,057 B2 | 5/2020 | Pawar et al. |
| 10,673,943 B2 | 6/2020 | Prahlad et al. |
| 10,678,758 B2 | 6/2020 | Dornemann |
| 10,684,883 B2 | 6/2020 | Deshpande et al. |
| 10,684,924 B2 | 6/2020 | Kilaru et al. |
| 10,732,885 B2 | 8/2020 | Gutta et al. |
| 10,733,143 B2 | 8/2020 | Pawar et al. |
| 10,747,630 B2 | 8/2020 | Sanakkayala et al. |
| 10,768,971 B2 | 9/2020 | Dornemann et al. |
| 10,776,209 B2 | 9/2020 | Pawar et al. |
| 10,838,824 B2 | 11/2020 | Klose |
| 10,853,195 B2 | 12/2020 | Ashraf et al. |
| 10,877,928 B2 | 12/2020 | Nagrale et al. |
| 10,884,635 B2 | 1/2021 | Gokhale et al. |
| 10,896,104 B2 | 1/2021 | Sanakkayala et al. |
| 10,990,484 B2 | 4/2021 | Gokhale et al. |
| 11,016,696 B2 | 5/2021 | Ankireddypalle et al. |
| 11,099,943 B2 | 8/2021 | Gokhale et al. |
| 11,099,956 B1 | 8/2021 | Polimera et al. |
| 11,200,124 B2 | 12/2021 | Rathi et al. |
| 2001/0044910 A1 | 11/2001 | Ricart et al. |
| 2002/0069369 A1 | 6/2002 | Tremain |
| 2002/0095609 A1 | 7/2002 | Tokunaga |
| 2002/0178143 A1 | 11/2002 | Fujimoto |
| 2002/0194511 A1 | 12/2002 | Swoboda |
| 2003/0021223 A1 | 1/2003 | Kashyap |
| 2003/0031127 A1 | 2/2003 | Saleh et al. |
| 2003/0056142 A1 | 3/2003 | Hashemi et al. |
| 2003/0074600 A1 | 4/2003 | Tamatsu |
| 2003/0084076 A1 | 5/2003 | Sekiguchi et al. |
| 2003/0126494 A1 | 7/2003 | Strasser |
| 2003/0149750 A1 | 8/2003 | Franzenburg |
| 2003/0163495 A1 | 8/2003 | Lanzatella et al. |
| 2003/0182301 A1 | 9/2003 | Patterson et al. |
| 2003/0182329 A1 | 9/2003 | Sato |
| 2003/0204597 A1 | 10/2003 | Arakawa et al. |
| 2003/0236956 A1 | 12/2003 | Grubbs et al. |
| 2004/0019892 A1 | 1/2004 | E. et al. |
| 2004/0030668 A1 | 2/2004 | Pawlowski et al. |
| 2004/0030822 A1 | 2/2004 | Rajan et al. |
| 2004/0044642 A1 | 3/2004 | Fujii et al. |
| 2004/0078654 A1 | 4/2004 | Holland et al. |
| 2004/0128442 A1 | 7/2004 | Hinshaw et al. |
| 2004/0139127 A1 | 7/2004 | Pofelski |
| 2004/0153823 A1 | 8/2004 | Ansari |
| 2004/0230899 A1 | 11/2004 | Pagnano et al. |
| 2004/0250033 A1 | 12/2004 | Prahlad et al. |
| 2004/0267838 A1 | 12/2004 | Curran et al. |
| 2004/0268175 A1 | 12/2004 | Koch et al. |
| 2005/0039069 A1 | 2/2005 | Prahlad et al. |
| 2005/0044114 A1 | 2/2005 | Kottomtharayil et al. |
| 2005/0060356 A1 | 3/2005 | Saika |
| 2005/0080970 A1 | 4/2005 | Jeyasingh et al. |
| 2005/0131996 A1 | 6/2005 | Mastrianni et al. |
| 2005/0138461 A1 | 6/2005 | Allen et al. |
| 2005/0183072 A1 | 8/2005 | Horning et al. |
| 2005/0187891 A1 | 8/2005 | Johnson et al. |
| 2005/0198303 A1 | 9/2005 | Knauerhase et al. |
| 2005/0216788 A1 | 9/2005 | Mani-Meitav et al. |
| 2005/0235286 A1 | 10/2005 | Ballew et al. |
| 2005/0257062 A1* | 11/2005 | Ignatius ............... H04L 9/0894 713/176 |
| 2005/0262033 A1 | 11/2005 | Yamashita |
| 2005/0262097 A1 | 11/2005 | Sim-Tang |
| 2005/0262316 A1 | 11/2005 | Obayashi et al. |
| 2005/0268156 A1 | 12/2005 | Mashayekhi et al. |
| 2005/0278397 A1* | 12/2005 | Clark ................. G06F 11/1458 |
| 2006/0005048 A1 | 1/2006 | Osaki |
| 2006/0010227 A1 | 1/2006 | Atluri |
| 2006/0026452 A1 | 2/2006 | Suzuki et al. |
| 2006/0036658 A1* | 2/2006 | Henrickson ......... G06F 11/1464 |
| 2006/0047626 A1 | 3/2006 | Raheem |
| 2006/0058994 A1 | 3/2006 | Ravi et al. |
| 2006/0085672 A1 | 4/2006 | Watanabe et al. |
| 2006/0101189 A1 | 5/2006 | Chandrasekaran et al. |
| 2006/0155594 A1 | 7/2006 | Almeida et al. |
| 2006/0155712 A1 | 7/2006 | Prahlad et al. |
| 2006/0184935 A1 | 8/2006 | Abels et al. |
| 2006/0195715 A1 | 8/2006 | Herington |
| 2006/0206547 A1 | 9/2006 | Kulkarni et al. |
| 2006/0224846 A1 | 10/2006 | Amarendran et al. |
| 2006/0225065 A1 | 10/2006 | Chandhok et al. |
| 2006/0230136 A1 | 10/2006 | Ma |
| 2006/0236054 A1 | 10/2006 | Kitamura et al. |
| 2007/0027999 A1 | 2/2007 | Allen et al. |
| 2007/0043870 A1 | 2/2007 | Ninose |
| 2007/0050526 A1 | 3/2007 | Abe et al. |
| 2007/0074068 A1 | 3/2007 | Hsieh |
| 2007/0094467 A1 | 4/2007 | Yamasaki |
| 2007/0094533 A1 | 4/2007 | Coombs et al. |
| 2007/0100792 A1 | 5/2007 | Lent et al. |
| 2007/0150499 A1 | 6/2007 | D'Souza et al. |
| 2007/0156793 A1 | 7/2007 | D'Souza et al. |
| 2007/0185922 A1 | 8/2007 | Kapoor et al. |
| 2007/0185938 A1 | 8/2007 | Prahlad et al. |
| 2007/0186068 A1 | 8/2007 | Agrawal |
| 2007/0198802 A1 | 8/2007 | Kavuri |
| 2007/0203938 A1 | 8/2007 | Prahlad et al. |
| 2007/0208918 A1 | 9/2007 | Harbin et al. |
| 2007/0220319 A1 | 9/2007 | Desai et al. |
| 2007/0226535 A1 | 9/2007 | Gokhale |
| 2007/0234108 A1 | 10/2007 | Cox et al. |
| 2007/0234302 A1 | 10/2007 | Suzuki et al. |
| 2007/0239804 A1 | 10/2007 | Armstrong et al. |
| 2007/0250365 A1 | 10/2007 | Chakrabarti et al. |
| 2007/0266056 A1 | 11/2007 | Stacey et al. |
| 2007/0271471 A1 | 11/2007 | Merzlikine et al. |
| 2007/0282921 A1 | 12/2007 | Atluri et al. |
| 2007/0283355 A1 | 12/2007 | Misono et al. |
| 2007/0299930 A1 | 12/2007 | Wendelrup et al. |
| 2008/0022058 A1 | 1/2008 | Nadathur et al. |
| 2008/0059704 A1 | 3/2008 | Kavuri |
| 2008/0071841 A1 | 3/2008 | Okada et al. |
| 2008/0091655 A1 | 4/2008 | Gokhale |
| 2008/0098049 A1 | 4/2008 | Pillai et al. |

(56) References Cited

U.S. PATENT DOCUMENTS

| | | |
|---|---|---|
| 2008/0126833 A1 | 5/2008 | Callaway et al. |
| 2008/0134177 A1 | 6/2008 | Fitzgerald et al. |
| 2008/0147754 A1 | 6/2008 | Littlefield et al. |
| 2008/0162840 A1 | 7/2008 | Augenstein |
| 2008/0189468 A1 | 8/2008 | Schmidt et al. |
| 2008/0195639 A1 | 8/2008 | Freeman et al. |
| 2008/0201600 A1 | 8/2008 | Lu |
| 2008/0228771 A1 | 9/2008 | Prahlad et al. |
| 2008/0228833 A1 | 9/2008 | Kano |
| 2008/0229037 A1 | 9/2008 | Bunte |
| 2008/0235479 A1 | 9/2008 | Scales et al. |
| 2008/0243855 A1 | 10/2008 | Prahlad |
| 2008/0243947 A1 | 10/2008 | Kaneda |
| 2008/0244068 A1 | 10/2008 | Iyoda et al. |
| 2008/0244177 A1 | 10/2008 | Crescenti et al. |
| 2008/0244204 A1 | 10/2008 | Cremelie et al. |
| 2008/0250407 A1 | 10/2008 | Dadhia et al. |
| 2008/0253283 A1 | 10/2008 | Douglis et al. |
| 2008/0270488 A1 | 10/2008 | Ozawa et al. |
| 2008/0270564 A1 | 10/2008 | Rangegowda et al. |
| 2008/0275924 A1 | 11/2008 | Fries |
| 2008/0282253 A1 | 11/2008 | Huizenga |
| 2008/0307020 A1 | 12/2008 | Ko et al. |
| 2008/0313371 A1 | 12/2008 | Kedem et al. |
| 2008/0320319 A1 | 12/2008 | Muller |
| 2009/0006733 A1 | 1/2009 | Gold et al. |
| 2009/0013258 A1 | 1/2009 | Hintermeister et al. |
| 2009/0037680 A1 | 2/2009 | Colbert et al. |
| 2009/0037763 A1 | 2/2009 | Adhya et al. |
| 2009/0055507 A1 | 2/2009 | Oeda |
| 2009/0077557 A1 | 3/2009 | Ichikawa et al. |
| 2009/0113109 A1 | 4/2009 | Nelson et al. |
| 2009/0144416 A1 | 6/2009 | Chatley et al. |
| 2009/0157882 A1 | 6/2009 | Kashyap |
| 2009/0183145 A1 | 7/2009 | Hu et al. |
| 2009/0204649 A1 | 8/2009 | Wong et al. |
| 2009/0210427 A1 | 8/2009 | Eidler et al. |
| 2009/0210458 A1 | 8/2009 | Glover et al. |
| 2009/0216816 A1 | 8/2009 | Basler et al. |
| 2009/0222496 A1 | 9/2009 | Liu et al. |
| 2009/0228669 A1 | 9/2009 | Siesarev et al. |
| 2009/0240904 A1 | 9/2009 | Austruy et al. |
| 2009/0243846 A1 | 10/2009 | Yuuki |
| 2009/0248762 A1 | 10/2009 | Prahlad et al. |
| 2009/0249005 A1 | 10/2009 | Bender et al. |
| 2009/0282404 A1 | 11/2009 | Khandekar et al. |
| 2009/0287665 A1 | 11/2009 | Prahlad |
| 2009/0300023 A1 | 12/2009 | Vaghani |
| 2009/0300057 A1 | 12/2009 | Friedman |
| 2009/0307166 A1 | 12/2009 | Routray et al. |
| 2009/0313260 A1 | 12/2009 | Mimatsu |
| 2009/0313447 A1 | 12/2009 | Nguyen et al. |
| 2009/0313503 A1 | 12/2009 | Atluri et al. |
| 2009/0319534 A1 | 12/2009 | Gokhale |
| 2009/0319585 A1 | 12/2009 | Gokhale |
| 2009/0320029 A1 | 12/2009 | Kottomtharayil |
| 2009/0320137 A1 | 12/2009 | White et al. |
| 2009/0327477 A1 | 12/2009 | Madison, Jr. et al. |
| 2010/0011178 A1 | 1/2010 | Feathergill |
| 2010/0017444 A1 | 1/2010 | Chatterjee et al. |
| 2010/0017647 A1 | 1/2010 | Callaway et al. |
| 2010/0030984 A1 | 2/2010 | Erickson |
| 2010/0031086 A1 | 2/2010 | Leppard |
| 2010/0042790 A1 | 2/2010 | Mondal et al. |
| 2010/0049929 A1 | 2/2010 | Nagarkar et al. |
| 2010/0049930 A1 | 2/2010 | Pershin |
| 2010/0070466 A1 | 3/2010 | Prahlad et al. |
| 2010/0070474 A1 | 3/2010 | Lad |
| 2010/0070478 A1 | 3/2010 | Anglin |
| 2010/0070725 A1 | 3/2010 | Prahlad et al. |
| 2010/0070726 A1 | 3/2010 | Ngo et al. |
| 2010/0077161 A1 | 3/2010 | Stoakes et al. |
| 2010/0082672 A1 | 4/2010 | Kottomtharayil |
| 2010/0094948 A1 | 4/2010 | Ganesh et al. |
| 2010/0094981 A1 | 4/2010 | Cordray |
| 2010/0101300 A1 | 4/2010 | Rigby et al. |
| 2010/0106691 A1 | 4/2010 | Preslan et al. |
| 2010/0107158 A1 | 4/2010 | Chen et al. |
| 2010/0107172 A1 | 4/2010 | Calinescu et al. |
| 2010/0161919 A1 | 6/2010 | Dodgson et al. |
| 2010/0162037 A1 | 6/2010 | Maule et al. |
| 2010/0186014 A1 | 7/2010 | Vaghani et al. |
| 2010/0211829 A1 | 8/2010 | Ziskind et al. |
| 2010/0223495 A1 | 9/2010 | Leppard |
| 2010/0228913 A1 | 9/2010 | Czezatke et al. |
| 2010/0242096 A1 | 9/2010 | Varadharajan et al. |
| 2010/0250549 A1 | 9/2010 | Muller et al. |
| 2010/0257523 A1 | 10/2010 | Frank |
| 2010/0262586 A1 | 10/2010 | Rosikiewicz et al. |
| 2010/0262794 A1 | 10/2010 | De Beer et al. |
| 2010/0280999 A1 | 11/2010 | Atluri et al. |
| 2010/0281458 A1 | 11/2010 | Paladino et al. |
| 2010/0293439 A1 | 11/2010 | Flynn et al. |
| 2010/0299309 A1 | 11/2010 | Maki et al. |
| 2010/0299490 A1 | 11/2010 | Attarde et al. |
| 2010/0299666 A1 | 11/2010 | Agbaria et al. |
| 2010/0306173 A1 | 12/2010 | Frank |
| 2010/0306486 A1 | 12/2010 | Balasubramanian et al. |
| 2010/0325471 A1 | 12/2010 | Mishra et al. |
| 2010/0325727 A1 | 12/2010 | Neystadt et al. |
| 2010/0332401 A1 | 12/2010 | Prahlad |
| 2010/0332454 A1 | 12/2010 | Prahlad et al. |
| 2010/0332456 A1 | 12/2010 | Prahlad et al. |
| 2010/0332479 A1 | 12/2010 | Prahlad |
| 2010/0332629 A1 | 12/2010 | Cotugno et al. |
| 2010/0332818 A1 | 12/2010 | Prahlad |
| 2010/0333100 A1 | 12/2010 | Miyazaki et al. |
| 2010/0333116 A1 | 12/2010 | Prahlad |
| 2011/0004586 A1 | 1/2011 | Cherryholmes et al. |
| 2011/0010515 A1 | 1/2011 | Ranade |
| 2011/0016467 A1 | 1/2011 | Kane |
| 2011/0022811 A1 | 1/2011 | Kirihata et al. |
| 2011/0023114 A1 | 1/2011 | Diab et al. |
| 2011/0035620 A1 | 2/2011 | Elyashev et al. |
| 2011/0047541 A1 | 2/2011 | Yamaguchi et al. |
| 2011/0061045 A1 | 3/2011 | Phillips |
| 2011/0072430 A1 | 3/2011 | Mani |
| 2011/0087632 A1 | 4/2011 | Subramanian et al. |
| 2011/0107025 A1 | 5/2011 | Urkude et al. |
| 2011/0107331 A1 | 5/2011 | Evans et al. |
| 2011/0153570 A1 | 6/2011 | Kim et al. |
| 2011/0154109 A1 | 6/2011 | Levine |
| 2011/0161299 A1 | 6/2011 | Prahlad |
| 2011/0179414 A1 | 7/2011 | Goggin et al. |
| 2011/0185355 A1 | 7/2011 | Chawla et al. |
| 2011/0191559 A1 | 8/2011 | Li et al. |
| 2011/0202728 A1 | 8/2011 | Nichols et al. |
| 2011/0202734 A1 | 8/2011 | Dhakras et al. |
| 2011/0208928 A1 | 8/2011 | Chandra et al. |
| 2011/0213754 A1 | 9/2011 | Bindal |
| 2011/0218967 A1 | 9/2011 | Sliger et al. |
| 2011/0219144 A1 | 9/2011 | Amit et al. |
| 2011/0225277 A1 | 9/2011 | Freimuth et al. |
| 2011/0234583 A1 | 9/2011 | Bakalash |
| 2011/0239013 A1 | 9/2011 | Muller |
| 2011/0246430 A1 | 10/2011 | Prahlad et al. |
| 2011/0252208 A1 | 10/2011 | Ali et al. |
| 2011/0264786 A1 | 10/2011 | Kedem et al. |
| 2011/0289281 A1 | 11/2011 | Spackman |
| 2012/0016840 A1 | 1/2012 | Lin et al. |
| 2012/0017027 A1 | 1/2012 | Baskakov et al. |
| 2012/0017043 A1 | 1/2012 | Aizman et al. |
| 2012/0017114 A1 | 1/2012 | Timashev et al. |
| 2012/0054736 A1 | 3/2012 | Arcese et al. |
| 2012/0072685 A1 | 3/2012 | Otani |
| 2012/0078881 A1 | 3/2012 | Crump et al. |
| 2012/0079221 A1 | 3/2012 | Sivasubramanian et al. |
| 2012/0084262 A1 | 4/2012 | Dwarampudi et al. |
| 2012/0084272 A1 | 4/2012 | Garces-Erice et al. |
| 2012/0084769 A1 | 4/2012 | Adi et al. |
| 2012/0096149 A1 | 4/2012 | Sunkara et al. |
| 2012/0101999 A1 | 4/2012 | Scherzinger et al. |
| 2012/0110328 A1 | 5/2012 | Pate et al. |
| 2012/0131295 A1 | 5/2012 | Nakajima |

(56) References Cited

U.S. PATENT DOCUMENTS

| | | |
|---|---|---|
| 2012/0131578 A1 | 5/2012 | Ciano et al. |
| 2012/0136832 A1 | 5/2012 | Sadhwani |
| 2012/0150815 A1 | 6/2012 | Parfumi |
| 2012/0150818 A1 | 6/2012 | Vijayan Retnamma et al. |
| 2012/0150826 A1 | 6/2012 | Vijayan Retnamma et al. |
| 2012/0150949 A1 | 6/2012 | Vijayan Retnamma et al. |
| 2012/0151084 A1 | 6/2012 | Stathopoulos et al. |
| 2012/0159232 A1 | 6/2012 | Shimada et al. |
| 2012/0167083 A1 | 6/2012 | Suit |
| 2012/0209812 A1 | 8/2012 | Bezbaruah |
| 2012/0221843 A1 | 8/2012 | Bak et al. |
| 2012/0233285 A1 | 9/2012 | Suzuki |
| 2012/0254119 A1 | 10/2012 | Kumarasamy et al. |
| 2012/0254364 A1 | 10/2012 | Vijayan |
| 2012/0254824 A1 | 10/2012 | Bansold |
| 2012/0278287 A1 | 11/2012 | Wilk |
| 2012/0278571 A1 | 11/2012 | Fleming et al. |
| 2012/0278799 A1 | 11/2012 | Starks et al. |
| 2012/0290802 A1 | 11/2012 | Wade et al. |
| 2012/0324183 A1 | 12/2012 | Chiruvolu et al. |
| 2012/0331248 A1 | 12/2012 | Kono et al. |
| 2013/0024641 A1 | 1/2013 | Talagala et al. |
| 2013/0024722 A1 | 1/2013 | Kotagiri |
| 2013/0036418 A1 | 2/2013 | Yadappanavar et al. |
| 2013/0042234 A1 | 2/2013 | Deluca et al. |
| 2013/0054533 A1 | 2/2013 | Hao et al. |
| 2013/0061014 A1 | 3/2013 | Prahlad et al. |
| 2013/0074181 A1 | 3/2013 | Singh |
| 2013/0080841 A1 | 3/2013 | Reddy et al. |
| 2013/0086580 A1 | 4/2013 | Simonsen et al. |
| 2013/0117744 A1 | 5/2013 | Klein et al. |
| 2013/0138880 A1 | 5/2013 | Murata |
| 2013/0173771 A1 | 7/2013 | Ditto et al. |
| 2013/0204849 A1 | 8/2013 | Chacko |
| 2013/0227558 A1 | 8/2013 | Du et al. |
| 2013/0232215 A1 | 9/2013 | Gupta et al. |
| 2013/0232480 A1 | 9/2013 | Winterfeldt et al. |
| 2013/0238562 A1 | 9/2013 | Kumarasamy et al. |
| 2013/0238572 A1 | 9/2013 | Prahlad et al. |
| 2013/0262390 A1 | 10/2013 | Kumarasamy et al. |
| 2013/0262396 A1 | 10/2013 | Kripalani et al. |
| 2013/0262638 A1 | 10/2013 | Kumarasamy et al. |
| 2013/0262801 A1 | 10/2013 | Sancheti et al. |
| 2013/0268931 A1 | 10/2013 | O'Hare et al. |
| 2013/0290267 A1 | 10/2013 | Dwarampudi et al. |
| 2013/0311429 A1 | 11/2013 | Agetsuma |
| 2013/0326260 A1 | 12/2013 | Wei et al. |
| 2014/0006858 A1 | 1/2014 | Helfman et al. |
| 2014/0007097 A1 | 1/2014 | Chin et al. |
| 2014/0007181 A1 | 1/2014 | Sarin et al. |
| 2014/0052892 A1 | 2/2014 | Klein et al. |
| 2014/0059380 A1 | 2/2014 | Krishnan |
| 2014/0075440 A1 | 3/2014 | Prahlad et al. |
| 2014/0082128 A1 | 3/2014 | Beard |
| 2014/0089266 A1 | 3/2014 | Une et al. |
| 2014/0095816 A1 | 4/2014 | Hsu et al. |
| 2014/0101300 A1 | 4/2014 | Rosensweig et al. |
| 2014/0115285 A1 | 4/2014 | Arcese et al. |
| 2014/0115287 A1 | 4/2014 | Schnapp et al. |
| 2014/0136803 A1 | 5/2014 | Qin |
| 2014/0143636 A1 | 5/2014 | Frost et al. |
| 2014/0156684 A1 | 6/2014 | Zaslavsky et al. |
| 2014/0181038 A1 | 6/2014 | Pawar et al. |
| 2014/0181044 A1 | 6/2014 | Pawar et al. |
| 2014/0181046 A1 | 6/2014 | Pawar et al. |
| 2014/0188803 A1 | 7/2014 | James et al. |
| 2014/0195749 A1 | 7/2014 | Colgrove et al. |
| 2014/0196037 A1 | 7/2014 | Gopalan et al. |
| 2014/0196038 A1 | 7/2014 | Kottomtharayil et al. |
| 2014/0196039 A1 | 7/2014 | Kottomtharayil et al. |
| 2014/0201142 A1 | 7/2014 | Varadharajan et al. |
| 2014/0201151 A1 | 7/2014 | Kumarasamy et al. |
| 2014/0201153 A1 | 7/2014 | Vijayan et al. |
| 2014/0201157 A1 | 7/2014 | Pawar et al. |
| 2014/0201162 A1 | 7/2014 | Kumarasamy et al. |
| 2014/0201170 A1 | 7/2014 | Vijayan et al. |
| 2014/0229451 A1 | 8/2014 | Venkatesh et al. |
| 2014/0237537 A1 | 8/2014 | Manmohan et al. |
| 2014/0244610 A1 | 8/2014 | Raman et al. |
| 2014/0258245 A1 | 9/2014 | Estes |
| 2014/0259015 A1 | 9/2014 | Chigusa et al. |
| 2014/0278530 A1 | 9/2014 | Bruce et al. |
| 2014/0281758 A1 | 9/2014 | Klein et al. |
| 2014/0282514 A1 | 9/2014 | Carson et al. |
| 2014/0330874 A1 | 11/2014 | Novak et al. |
| 2014/0337285 A1 | 11/2014 | Gokhale et al. |
| 2014/0337295 A1 | 11/2014 | Haselton et al. |
| 2014/0337664 A1 | 11/2014 | Gokhale et al. |
| 2014/0344323 A1 | 11/2014 | Pelavin et al. |
| 2014/0372384 A1 | 12/2014 | Long et al. |
| 2014/0372788 A1 | 12/2014 | Vavrick et al. |
| 2015/0026508 A1 | 1/2015 | Jacobs et al. |
| 2015/0058382 A1 | 2/2015 | St. Laurent |
| 2015/0067391 A1 | 3/2015 | Merchant et al. |
| 2015/0067393 A1 | 3/2015 | Madani et al. |
| 2015/0074536 A1 | 3/2015 | Varadharajan et al. |
| 2015/0088821 A1 | 3/2015 | Blea et al. |
| 2015/0089185 A1 | 3/2015 | Brandyberry et al. |
| 2015/0095908 A1 | 4/2015 | Jacobs et al. |
| 2015/0120928 A1 | 4/2015 | Gummaraju et al. |
| 2015/0121122 A1 | 4/2015 | Towstopiat et al. |
| 2015/0134607 A1 | 5/2015 | Magdon-Ismail et al. |
| 2015/0142745 A1 | 5/2015 | Tekade et al. |
| 2015/0149813 A1 | 5/2015 | Mizuno et al. |
| 2015/0160884 A1 | 6/2015 | Scales et al. |
| 2015/0161015 A1 | 6/2015 | Kumarasamy et al. |
| 2015/0163172 A1 | 6/2015 | Mudigonda et al. |
| 2015/0199238 A1* | 7/2015 | Badgley .......... G06F 16/2228 707/682 |
| 2015/0205682 A1 | 7/2015 | Gokhale et al. |
| 2015/0227438 A1 | 8/2015 | Jaquette |
| 2015/0227602 A1 | 8/2015 | Ramu |
| 2015/0242283 A1 | 8/2015 | Simoncelli et al. |
| 2015/0248333 A1 | 9/2015 | Aravot |
| 2015/0268876 A1 | 9/2015 | Ahn et al. |
| 2015/0278046 A1 | 10/2015 | Zellermayer et al. |
| 2015/0293817 A1 | 10/2015 | Subramanian et al. |
| 2015/0317216 A1 | 11/2015 | Hsu et al. |
| 2015/0347165 A1 | 12/2015 | Lipchuk et al. |
| 2015/0347306 A1 | 12/2015 | Gschwind |
| 2015/0347430 A1 | 12/2015 | Ghosh |
| 2015/0350027 A1 | 12/2015 | Raissinia et al. |
| 2015/0363254 A1 | 12/2015 | Satoyama et al. |
| 2015/0363413 A1 | 12/2015 | Ghosh |
| 2015/0370652 A1 | 12/2015 | He et al. |
| 2015/0370668 A1 | 12/2015 | Nazari et al. |
| 2015/0378758 A1 | 12/2015 | Duggan et al. |
| 2015/0378771 A1 | 12/2015 | Tarasuk-Levin |
| 2015/0378833 A1 | 12/2015 | Misra et al. |
| 2015/0378849 A1 | 12/2015 | Liu et al. |
| 2015/0381711 A1 | 12/2015 | Singh et al. |
| 2016/0019317 A1 | 1/2016 | Pawar et al. |
| 2016/0026405 A1 | 1/2016 | Dhuse |
| 2016/0070623 A1 | 3/2016 | Derk |
| 2016/0085606 A1 | 3/2016 | Panasko et al. |
| 2016/0092467 A1 | 3/2016 | Lee et al. |
| 2016/0132400 A1 | 5/2016 | Pawar et al. |
| 2016/0154709 A1 | 6/2016 | Mitkar et al. |
| 2016/0170844 A1 | 6/2016 | Long et al. |
| 2016/0188413 A1 | 6/2016 | Abali et al. |
| 2016/0202916 A1 | 7/2016 | Cui et al. |
| 2016/0203060 A1 | 7/2016 | Singh |
| 2016/0210064 A1 | 7/2016 | Dornemann et al. |
| 2016/0226966 A1 | 8/2016 | Lin |
| 2016/0283335 A1 | 9/2016 | Yao et al. |
| 2016/0299818 A1 | 10/2016 | Vijayan et al. |
| 2016/0306706 A1 | 10/2016 | Pawar et al. |
| 2016/0308722 A1 | 10/2016 | Kumarasamy et al. |
| 2016/0335007 A1 | 11/2016 | Ryu et al. |
| 2016/0350391 A1 | 12/2016 | Vijayan et al. |
| 2016/0371127 A1 | 12/2016 | Antony |
| 2017/0031768 A1 | 2/2017 | Sarab |
| 2017/0054720 A1 | 2/2017 | Geng et al. |
| 2017/0090972 A1 | 3/2017 | Ryu et al. |

(56) References Cited

U.S. PATENT DOCUMENTS

| | | |
|---|---|---|
| 2017/0123939 A1 | 5/2017 | Maheshwari et al. |
| 2017/0168903 A1 | 6/2017 | Dornemann et al. |
| 2017/0185488 A1 | 6/2017 | Kumarasamy et al. |
| 2017/0192866 A1 | 7/2017 | Vijayan et al. |
| 2017/0192868 A1 | 7/2017 | Vijayan et al. |
| 2017/0193003 A1 | 7/2017 | Vijayan et al. |
| 2017/0235647 A1 | 8/2017 | Kilaru et al. |
| 2017/0242871 A1 | 8/2017 | Kilaru et al. |
| 2017/0249220 A1 | 8/2017 | Kumarasamy et al. |
| 2017/0265648 A1 | 8/2017 | Klose |
| 2017/0262204 A1 | 9/2017 | Dornemann et al. |
| 2017/0262347 A1 | 9/2017 | Dornemann |
| 2017/0262350 A1 | 9/2017 | Dornemann |
| 2017/0264589 A1 | 9/2017 | Hunt et al. |
| 2017/0286230 A1 | 10/2017 | Zamir |
| 2017/0315876 A1 | 11/2017 | Dornquast et al. |
| 2017/0371547 A1 | 12/2017 | Fruchtman et al. |
| 2018/0011885 A1 | 1/2018 | Prahlad et al. |
| 2018/0067955 A1 | 3/2018 | Pawar et al. |
| 2018/0074914 A1 | 3/2018 | Gokhale et al. |
| 2018/0075166 A1 | 3/2018 | Pawar et al. |
| 2018/0089031 A1 | 3/2018 | Dornemann et al. |
| 2018/0095846 A1 | 4/2018 | Sanakkayala et al. |
| 2018/0113623 A1 | 4/2018 | Sancheti |
| 2018/0143879 A1 | 5/2018 | Dornemann |
| 2018/0143880 A1 | 5/2018 | Dornemann |
| 2018/0173454 A1 | 6/2018 | Dornemann et al. |
| 2018/0181598 A1 | 6/2018 | Pawar et al. |
| 2018/0253192 A1 | 9/2018 | Varadharajan et al. |
| 2018/0260157 A1 | 9/2018 | Dornemann et al. |
| 2018/0267861 A1 | 9/2018 | Iyer et al. |
| 2018/0275913 A1 | 9/2018 | Mitkar et al. |
| 2018/0276022 A1 | 9/2018 | Mitkar et al. |
| 2018/0276083 A1 | 9/2018 | Mitkar et al. |
| 2018/0276084 A1 | 9/2018 | Mitkar et al. |
| 2018/0276085 A1 | 9/2018 | Mitkar et al. |
| 2018/0284986 A1 | 10/2018 | Bhagi et al. |
| 2018/0285202 A1 | 10/2018 | Bhagi et al. |
| 2018/0285209 A1 | 10/2018 | Liu et al. |
| 2018/0285215 A1 | 10/2018 | Ashraf et al. |
| 2018/0285353 A1 | 10/2018 | Rao et al. |
| 2018/0300168 A1 | 10/2018 | Deshpande et al. |
| 2018/0307510 A1 | 10/2018 | Kottomtharayil et al. |
| 2018/0314694 A1 | 11/2018 | Dornemann et al. |
| 2018/0329636 A1 | 11/2018 | Dornemann et al. |
| 2018/0373597 A1 | 12/2018 | Rana |
| 2018/0373601 A1 | 12/2018 | Klose |
| 2019/0012339 A1 | 1/2019 | Kumarasamy et al. |
| 2019/0026187 A1 | 1/2019 | Gulam et al. |
| 2019/0065069 A1 | 2/2019 | Sancheti et al. |
| 2019/0090305 A1 | 3/2019 | Hunter et al. |
| 2019/0108341 A1 | 4/2019 | Bedhapudi et al. |
| 2019/0196916 A1 | 6/2019 | Kumarasamy et al. |
| 2019/0205216 A1 | 7/2019 | Gokhale et al. |
| 2019/0205217 A1 | 7/2019 | Gokhale et al. |
| 2019/0258411 A1 | 8/2019 | Gokhale et al. |
| 2019/0272220 A1 | 9/2019 | Vijayan et al. |
| 2019/0272221 A1 | 9/2019 | Vijayan et al. |
| 2019/0278662 A1 | 9/2019 | Nagrale et al. |
| 2019/0324791 A1 | 10/2019 | Kripalani |
| 2019/0347120 A1 | 11/2019 | Kottomtharayil et al. |
| 2019/0369901 A1 | 12/2019 | Dornemann et al. |
| 2019/0370107 A1 | 12/2019 | Subburasu et al. |
| 2019/0391742 A1 | 12/2019 | Bhagi et al. |
| 2020/0034252 A1 | 1/2020 | Mitkar et al. |
| 2020/0142612 A1 | 5/2020 | Dornemann et al. |
| 2020/0142782 A1 | 5/2020 | Dornemann |
| 2020/0142783 A1 | 5/2020 | Dornemann |
| 2020/0174894 A1 | 6/2020 | Dornemann |
| 2020/0174895 A1 | 6/2020 | Dornemann |
| 2020/0183728 A1 | 6/2020 | Deshpande et al. |
| 2020/0183802 A1 | 6/2020 | Rathi et al. |
| 2020/0241907 A1 | 7/2020 | Dornemann et al. |
| 2020/0241908 A1 | 7/2020 | Dornemann et al. |
| 2020/0265024 A1 | 8/2020 | Pawar et al. |
| 2020/0301891 A1 | 9/2020 | Dornemann |
| 2020/0327163 A1 | 10/2020 | Pawar et al. |
| 2020/0334113 A1 | 10/2020 | Sanakkayala et al. |
| 2020/0334201 A1 | 10/2020 | Pawar et al. |
| 2020/0334221 A1 | 10/2020 | Prahlad et al. |
| 2021/0026741 A1 | 1/2021 | Klose |
| 2021/0334002 A1 | 10/2021 | Ankireddypalle et al. |
| 2021/0342237 A1 | 11/2021 | Polimera et al. |
| 2022/0012135 A1 | 1/2022 | Gokhale et al. |
| 2022/0043727 A1 | 2/2022 | Rathi et al. |

FOREIGN PATENT DOCUMENTS

| | | |
|---|---|---|
| DE | 69415115.7 | 8/1999 |
| DE | 60020978.4 | 4/2006 |
| EP | 0259912 | 3/1988 |
| EP | 0405926 | 1/1991 |
| EP | 0467546 | 1/1992 |
| EP | 0541281 | 5/1993 |
| EP | 0645709 | 3/1995 |
| EP | 0774715 | 5/1997 |
| EP | 0809184 | 11/1997 |
| EP | 0817040 A2 | 1/1998 |
| EP | 0899662 | 3/1999 |
| EP | 0981090 | 2/2000 |
| EP | 1204922 | 5/2002 |
| EP | 1209569 A1 | 5/2002 |
| EP | 1384135 | 1/2004 |
| EP | 1387269 A1 | 2/2004 |
| EP | 1393181 | 3/2004 |
| EP | 1533701 | 5/2005 |
| EP | 1938192 B1 | 11/2009 |
| GB | 2447361 | 9/2008 |
| JP | 4198050 | 12/2008 |
| JP | 4267443 | 5/2009 |
| WO | WO 1995/013580 | 5/1995 |
| WO | WO 1999/012098 | 3/1999 |
| WO | WO 2004/023317 | 3/2004 |
| WO | WO 2005/050449 A1 | 6/2005 |
| WO | WO 2005/103955 A1 | 11/2005 |
| WO | WO 2006/052872 | 5/2006 |
| WO | WO2007002398 A2 * | 1/2007 |
| WO | WO 2007/021678 A2 | 2/2007 |
| WO | WO2010/140264 A1 | 12/2010 |

OTHER PUBLICATIONS

Arneson, "Mass Storage Archiving in Network Environments" IEEE, 1998, pp. 45-50.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Levy et al., "Log-Driven Backups: A Recovery Scheme for Large Memory Database Systems", IEEE 1990, pp. 99-109.

IBM Technical Disclosure Bulletin, vol. 24, No. 5, Oct. 1981 New York, US, pp. 2404-2406, K.L. Huff, "Data Set Usage Sequence Number".

Rosenblum et al., "The Design and Implementation of a Log-Structure File System," Operating Systems Review SIGOPS, vol. 25, No. 5, New York, US, pp. 1-15 (May 1991).

Bhagwat et al., "Extreme Binning: Scalable, Parallel Deduplication for Chunk-based File Backup", IEEE International Symposium on Modeling, Analysis & Simulation of Computer and Telecommunication Systems, Sep. 2009, pp. 1-9.

Li et al., "Research on the Backup Mechanism of Oracle Database" International Conference on Environmental Science and Information Application Technology, Jul. 2009, pp. 423-426.

Fu et al., "Fine Grained Transaction Log for Data Recovery in Database Systems", Third Asia-Pacific Trusted Infrastructure Technologies Conference, IEEE, 2008, pp. 123-131.

Adjeroh, Donald A., and Kingsley C. Nwosu. "Multimedia database management-requirements and issues." IEEE multimedia 4.3 (1997): pp. 24-33. (Year: 1997).

(56) References Cited

OTHER PUBLICATIONS

Armstead et al., "Implementation of a Campus-wide Distributed Mass Storage Service: The Dream vs. Reality," IEEE, Sep. 11-14, 1995, pp. 190-199.
Bonvin, Nicolas, Thanasis G. Papaioannou, and Karl Aberer. "Dynamic cost-efficient replication in data clouds." Proceedings of the 1st Workshop on Automated Control for Datacenters and Clouds. 2009.pp.49-56 (Year: 2009).
Brandon, J., "Virtualization Shakes Up Backup Strategy," <http://www.computerworld.com>, Feb. 21, 2008, 3 pages.
Celesti, et al., "Improving Virtual Machine Migration in Federated Cloud Environments", 2010, pp. 61-67.
Chan, et al., "An Approach to High Availability for Cloud Servers with Snapshot Mechanism," 2012, pp. 1-6.
Chen et al., "When Virtual Is Better Than Real", IEEE 2001, pp. 133-138.
Chervenak, et al., "Protecting File Systems—A Survey of Backup Techniques," 1998, pp. 17-31.
Chiappetta, Marco, "ESA Enthusiast System Architecture," <http://hothardware.com/Articles/NVIDIA--ESA--Enthusiast--System--Architecture/>, Nov. 5, 2007, 2 pages.
CommVault Systems, Inc., "A CommVault White Paper: VMware Consolidated Backup (VCB) Certification Information Kit," 2007, 23 pages.
CommVault Systems, Inc., "CommVault Solutions—VMware," <http://www.commvault.com/solutions/vmware/>, accessed Apr. 30, 2014, 1 page.
CommVault Systems, Inc., "Enhanced Protection and Manageability of Virtual Servers," Partner Solution Brief, 2008, 6 pages.
Cully, et al., "Remus: High Availability via Asynchronous Virtual Machine Replication", 2008, pp. 161-174.
Data Protection for Large Vmware and Vblock Environments Using EMC Avamar Applied Technology, Nov. 2010, EMC Corporation, 26 pages.
Davis, D., "3 VMware Consolidated Backup (VCB) Utilities You Should Know," Petri IT Knowlegebase, <http://www.petri.co.il/vmware-consolidated-backup-utilities.htm>, Nov. 16, 2007, 3 pages.
Davis, D., "Understanding VMware VMX Configuration Files," Petri IT Knowledgebase, <http://www.petri.co.il/virtual_vmware_vmx_configuration_files.htm>, Nov. 16, 2007, 3 pages.
Davis, D., "VMware Server & Workstation Disk Files Explained," Petri IT Knowledgebase, <http://www.petri.co.il/virtual_vmware_files_explained.htm>, May 3, 2008, 3 pages.
Davis, D., "VMware Versions Compared," Petri IT Knowledgebase, <http://www.petri.co.il/virtual_vmware_versions_compared.htm>, Nov. 16, 2007, 3 pages.
Deng, et al., "Fast Saving and Restoring Virtual Machines with Page Compression", 2011, pp. 150-157.
Diallo, Ousmane, et al. "Distributed database management techniques for wireless sensor networks." IEEE Transactions on Parallel and Distributed Systems 26.2 (2013): pp. 604-620. (Year: 2013).
Eldos Callback File System product information from https://www.eldos.com/clients/104-345.php retrieved on Dec. 30, 2016, in 2 pages.
Eldos Usermode filesystem for your Windows applications—Callback File System® (CBFS®)—Create and manage virtual filesystems and disks from your Windows applications retrieved from https://eldos.com/cbfs on Dec. 30, 2016, in 4 pages.
Fraser et al., "Safe Hardware Access With the Xen Virtual Machine Monitor", 1st Workshop on Operating System and Architectural Support for the demand IT Infrastructure (OASIS), 2004, pp. 1-10.
Gait, "The Optical File Cabinet: A Random-Access File System for Write-Once Optical Disks," IEEE Computer, vol. 21, No. 6, pp. 11-22 (Jun. 1988) (see in particular figure 5 in p. 15 and recitation in claim 5).
Galan et al. "Service Specification in Cloud Environments Based on Extension to Oper Standards" COMSWARE Jun. 16-19, 2009 Dublin, Ireland ACM.
Gibson, et al., "Implementing Preinstallation Environment Media for Use in User Support," 2007, pp. 129-130.

Gorton, Ian, and John Klein. "Distribution, data, deployment: Software architecture convergence in big data systems." IEEE Software 32.3 (2014): pp. 78-85. (Year: 2014).
Granger, et al., "Survivable Storage Systems", 2001, pp. 184-195.
Gupta, et al., "GPFS-SNC: An enterprise storage framework for virtual-machine clouds", 2011, pp. 1-10.
Haselhorst, et al., "Efficient Storage Synchronization for Live Migration in Cloud Infrastructures", 2011, pp. 511-518.
Hirofuchio, Takahiro et al., "A live storage migration mechanism over wan and its performance evaluation," 2009, pp. 67-74.
Hirofuchi, et al., "Enabling Instantaneous Relocation of Virtual Machines with a Lightweight VMM Extension", 2010, pp. 73-83.
Hu, et al., "Virtual Machine based Hot-spare Fault-tolerant System", 2009, pp. 429-432.
Hu, Wenjin et al., "A Quantitative Study of Virtual Machine Live Migration," 2013, pp. 1-10.
Huff, "Data Set Usage Sequence Number," IBM Technical Disclosure Bulletin, vol. 24, No. 5, Oct. 1981 New York, US, pp. 2404-2406.
Ibrahim, Shadi et al., "CLOUDLET: Towards MapReduce Implementation on Virtual Machines," 2009, pp. 65-66.
Ismail et al., Architecture of Scalable Backup Service for Private Cloud, IEEE 2013, pp. 174-179.
Jander, "Launching Storage-Area Net," Data Communications, US, McGraw Hill, NY, vol. 27, No. 4 (Mar. 21, 1998), pp. 64-72.
Javaraiah, et al., "Backup for Cloud and Disaster Recovery for Consumers and SMBs," 2008, pp. 1-3.
Jhawar et al., "Fault Tolerance Management in Cloud Computing: A System-Level Perspective", IEEE Systems Journal, vol. 7, No. 2, 2013, pp. 288-297.
Jo, et al., "Efficient Live Migration of Virtual Machines Using Shared Storage", 2013, pp. 1-10.
Kashyap "RLC—A Reliable approach to Fast and Efficient Live Migration of Virtual Machines in the Clouds" IEEE 2014 IEEE Computer Society.
Kim, et al., "Availability Modeling and Analysis of a Virtualized System," 2009, pp. 365-371.
Kuo, et al., "A Hybrid Cloud Storage Architecture for Service Operational High Availability", 2013, pp. 487-492.
Li et al. "Comparing Containers versus Virtual Machines for Achieving High Availability" 2015 IEEE.
Liang, et al., "A virtual disk environment for providing file system recovery", 2006, pp. 589-599.
Lu et al., "Virtual Machine Memory Access Tracing with Hypervisor Exclusive Cache", Usenix Annual Technical Conference, 2007, pp. 29-43.
Mao, et al., "Read-Performance Optimization for Deduplication-Based Storage Systems in the Cloud", 2014, pp. 1-22.
Microsoft Corporation, "How NTFS Works," Windows Server TechCenter, <http://technet2.mircrosoft.com/windowsserver/en/library/8cc5891d-bf8e-4164-862d-dac5418c5948 . . . >, updated Mar. 28, 2003, internet accessed Mar. 26, 2008, 26 pages.
Migrate a Virtual Machine with Storage vMotion in the vSphere Client. http://pubs.vmware.com/vsphere-51/advanced/print/jsp?topic=/com.vmware.vsphere.vcent . . . Retrieved Aug. 12, 2014; 2 pages.
Nance et al., "Virtual Machine Introspection: Observation or Interference?", 2008 IEEE.
Ng, Chun-Ho et al., "Live Deduplication Storage of Virtual Machine Images in an Open-Source Cloud," 2011, pp. 80-99.
Nicolae, Bogdan et al., "A Hybrid Local Storage Transfer Scheme for Live Migration of 1/0 Intensive Workloads," 2012, pp. 85-96.
Reingold, B. et al., "Cloud Computing: The Intersection of Massive Scalability, Data Security and Privacy (Part I)," LegalWorks, a Thomson Business, Jun. 2009, 5 pages.
Reingold, B. et al., "Cloud Computing: Industry and Government Developments (Part II)," LegalWorks, Sep. 2009, 5 pages.
Reingold, B. et al., "Cloud Computing: Whose Law Governs the Cloud? (Part III)," LegalWorks, Jan.-Feb. 2010, 6 pages.
Sanbarrow.com, "Disktype-table," <http://sanbarrow.com/vmdk/disktypes.html>, internet accessed on Apr. 30, 2014, 4 pages.

(56) References Cited

OTHER PUBLICATIONS

Sanbarrow.com, "Files Used by a VM," <http://sanbarrow.com/vmx/vmx-files-used-by-a-vm.html>, internet accessed on Apr. 30, 2014, 1 page.
Sanbarrow.com, "Monolithic Versus Split Disks," <http://sanbarrow.com/vmdk/monolithicversusspllit.html>, internet accessed on Jul. 14, 2008, 2 pages.
Somasundaram et al., Information Storage and Management. 2009, pp. 251-281.
Terry, Douglas B., et al. "Managing update conflicts in Bayou, a weakly connected replicated storage system." ACM SIGOPS Operating Systems Review 29.5 (1995): pp. 172-182. (Year: 1995).
Tran, et al., "Efficient Cooperative Backup with Decentralized Trust Management", 2012, pp. 1-25.
Travostino, et al., "Seamless live migration of virtual machines over the MAN/WAN", 2006, pp. 901-907.
Tudoran, Radu et al., "Adaptive File Management for Scientific Workflows on the Azure Cloud," 2013, pp. 273-281.
Vaghani, "Virtual Machine File System", 2010, pp. 57-70.
VMware, Inc., "VMware Solution Exchange (VSX)" <http://www.vmware.com/appliances/learn/ovf.html>, 2014, 3 pages.
VMware, Inc., "OVF, Open Virtual Machine Format Specification, version 0.9," White Paper, <http://www.vmware.com>, Sep. 7, 2007, 50 pages.
VMware, Inc., "The Open Virtual Machine Format Whitepaper for OVF Specification, version 0.9," White Paper, <http://www.vmware.com>, 2007, 16 pages.
VMware, Inc., "Understanding VMware Consolidated Backup," White Paper, <http://www.vmware.com>, accessed Apr. 30, 2014, 11 pages.
VMware, Inc., "Using VMware Infrastructure for Backup and Restore," Best Practices, <http://www.vmware.com>, accessed Apr. 30, 2014, 20 pages.
VMware, Inc., "Virtual Disk API Programming Guide," <http://www.vmware.com>, Revision Apr. 11, 2008, 2008, 44 pages.
VMware, Inc., "Virtual Disk Format 1.1," VMware Technical Note, <http://www.vmware.com>, Revision Nov. 13, 2007, Version 1.1, 2007, 18 pages.
VMware, Inc., "Virtualized iSCSI SANS: Flexible, Scalable Enterprise Storage for Virtual Infrastructures," White Paper, <http://www.vmware.com>, Mar. 2008, 13 pages.
VMware, Inc., "Virtual Machine Backup Guide, ESX Server 3.5, ESX Server 3i version 3.5, VirtualCenter2.5," <http://www.vmware.com>, updated Feb. 21, 2008, 78 pages.
VMware, Inc., "Virtual Machine Backup Guide, ESX Server 3.0.1 and VirtualCenter2.0.1," <http://www.vmware.com>, updated Nov. 21, 2007, 74 pages.
VMware, Inc., "VMware Consolidated Backup," Product Datasheet, <http://www.vmware.com>, 2009, 2 pages.
VMware, Inc., "VMware Consolidated Backup, Improvements in Version 3.5," Information Guide, <http://www.vmware.com>, accessed Apr. 30, 2014, 11 pages.
VMware, Inc., "VMware ESX 3.5," Product Datasheet, <http://www.vmware.com>, 2008, 4 pages.
VMware, Inc., "VMware GSX Server 3.2, Disk Types: Virtual and Physical," <http://www.vmware.com/support/gsx3/doc/disks_types_gsx.html>, 2008, 2 pages.
VMware, Inc., "VMware OVF Tool," Technical Note, <http://www.vmware.com>, 2007, 4 pages.
VMware, Inc., "VMware Workstation 5.0, Snapshots in a Process Tree," <http://www.vmware.com/support/ws5/doc/ws_preserve_sshot_tree.html>, accessed Apr. 30, 2014, 1 page.
VMware, Inc., "VMware Workstation 5.0, Snapshots in a Linear Process," <http:/www.vmware.com/support/ws5/doc/ws_preserve_sshot_linear.html>, internet accessed on 2014, 1 page.
VMware, Inc., "VMware Workstation 5.5, What Files Make Up a Virtual Machine?" <http://www.vmware.com/support/ws55/doc/ws_learning_files_in_a_vm.html>, 2014, 2 pages.
VMware Storage VMotion—Non-Disruptive Live Migration for Virtual Machine Storage Disk Files. Copyright 2009 VMware, Inc.; 2 pages.
Vrable, et al., "Cumulus: Filesystem Backup to the Cloud", 2009, pp. 1-28.
VSphere Storage vMotion: Storage Management & Virtual Machine Migration.
Weil, Sage A., et al. "CRUSH: Controlled, scalable, decentralized placement of replicated data." SC'06: Proceedings of the 2006 ACM/IEEE Conference on Supercomputing. IEEE, 2006, pp. 1-12 (Year: 2006).
Wikipedia, "Cloud computing," <http://en.wikipedia.org/wiki/Cloud-computing>, 2009, 11 pages.
Wikipedia, "Cluster (file system)," <http://en.wikipedia.org/wiki/Cluster_%28file_system%29>, Sep. 2, 2008, 1 page.
Wikipedia, "Cylinder-head-sector," <http://en.wikipedia.org/wiki/Cylinder-head-sector>, Jan. 4, 2009, 6 pages.
Wikipedia, "File Allocation Table," <http://en.wikipedia.org/wiki/File_Allocation_Table>, Dec. 3, 2008, 12 pages.
Wikipedia, "Logical Disk Manager," <http://en.wikipedia.org/wiki/Logical_Disk_Manager>, Nov. 16, 2007, 3 pages.
Wikipedia, "Logical Volume Management," <http://en.wikipedia.org/wiki/Logical_volume_management>, Oct. 27, 2008, 3 pages.
Wikipedia, "Storage Area Network," <http://en.wikipedia.org/wiki/Storage_area_network>, Dec. 5, 2008, 5 pages.
Wikipedia, "Virtualization," <http://en.wikipedia.org/wiki/Virtualization>, Apr. 29, 2014, 7 pages.
Wood, et al., "Disaster Recovery as a Cloud Service: Economic Benefits & Deployment Challenges", 2010, pp. 1-7.
Yang, et al., "Toward Reliable Data Delivery for Highly Dynamic Mobile Ad Hoc Networks," 2012, pp. 111-124.
Yang, et al., "TRAP-Array: A Disk Array Architecture Providing Timely Recovery to Any Point-in-time," 2006, pp. 1-12.
Yoshida et al., "Orthros: A High-Reliability Operating System with Transmigration of Processes," 2013, pp. 318-327.
Zhao, et al., "Adaptive Distributed Load Balancing Algorithm based on Live Migration of Virtual Machines in Cloud", 2009, pp. 170-175.
Zhao, et al., Supporting Application-Tailored Grid File System Sessions with WSRF-Based Services, Advanced Computing and Information Systems Laboratory (ACIS), pp. 24-33.
International Search Report and Written Opinion for PCT/US2011/054374, dated May 2, 2012, 7 pages.
International Preliminary Report on Patentability and Written Opinion for PCT/US2011/054374, dated Apr. 2, 2013, 9 pages.

* cited by examiner

FAILOVER SYSTEMS AND METHODS FOR PERFORMING BACKUP OPERATIONS, INCLUDING HETEROGENEOUS INDEXING AND LOAD BALANCING OF BACKUP AND INDEXING RESOURCES

CROSS-REFERENCE TO RELATED APPLICATIONS

The present application is a Continuation-in-Part of U.S. patent application Ser. No. 15/684,410 filed Aug. 23, 2017, which is a continuation of U.S. patent application Ser. No. 14/675,524 filed Mar. 31, 2015, which is a continuation of U.S. patent application Ser. No. 13/958,353 filed Aug. 2, 2013 (now U.S. Pat. No. 9,026,497), which is a continuation of U.S. patent application Ser. No. 12/982,165 filed Dec. 30, 2010 (now U.S. Pat. No. 8,504,526), which claims the benefit of priority under 35 U.S.C. § 119(e) of U.S. Provisional Patent Application No. 61/351,790, filed on Jun. 4, 2010, and entitled "Failover Systems And Methods For Performing Backup Operations," each of which is hereby incorporated herein by reference in its entirety. The present application also claims the benefit of priority under 35 U.S.C. § 119(e) to U.S. Provisional Patent Application No. 62/811,424 entitled "Heterogeneous Indexing In A Data Storage Management System" and filed on Feb. 27, 2019, which is incorporated herein by reference in its entirety. Any and all applications for which a foreign or domestic priority claim is identified in the Application Data Sheet, or any correction thereto, are hereby incorporated by reference under 37 CFR 1.57.

BACKGROUND

Computers have become an integral part of business operations such that many banks, insurance companies, brokerage firms, financial service providers, and a variety of other businesses rely on computer networks to store, manipulate, and display information that is constantly subject to change. Oftentimes, the success or failure of an important transaction may turn on the availability of information that is both accurate and current. Accordingly, businesses worldwide recognize the commercial value of their data and seek reliable, cost-effective ways to protect the information stored on their computer networks.

To protect this stored data, network administrators can create backup copies of the stored information so that if the original data is destroyed or corrupted, the backup copy can be restored and used in place of the original data. One drawback, however, with conventional backup systems is that an interruption of the backup process can require the entire process to be restarted, thereby resulting in a loss of valuable time and resources, especially for large backup operations.

SUMMARY

In view of the foregoing, a need exists for improved systems and methods for performing backup operations. For example, there is a need for failover systems and methods for backing up data in a storage environment. In yet other embodiments, a need exists for load balancing between modules tasked with performing the backup operations and/or indexing the data such that when one module fails or is overloaded, another module can continue the process in place of the failed module. Load balancing features enable a smooth allocation and transition of resources that can reduce the chance of failure during backups.

In certain embodiments of the invention, a tiered storage system (hereinafter "backup system" or "storage system") is disclosed that provides for failover protection during data backup operations. In certain embodiments, the backup system provides for an index, or catalog, (hereinafter "index/catalog") for identifying and enabling restoration of backup data located on a storage device. Because there is no limitation on the number of index/catalogs provided, some embodiments include different index/catalogs that are generated and maintained by different indexing technologies and/or methodologies in the backup system. The backup system further maintains a set of transaction logs (or "action logs" or "log files" or "transaction log files") generated by media agent modules; the transaction logs comprise metadata with respect to individual data chunks of a backup file on the storage device and/or other metadata associated with storage operations such as backup and restore. The transaction logs are generated by the storage operation and thereafter are processed into the index/catalog(s), thereby removing a dependency between completion of the storage operation and indexing of the transaction logs. The transaction logs reduce system latency, as they are generated faster than indexing operations. A copy of the index/catalog and transaction logs can be stored at location(s) accessible by each of the media agent modules. In this manner, in case of a failure of one media agent module during backup, the transaction logs and existing index/catalog can be used by a second media agent module to resume the backup operation without requiring a restart of the backup process.

Heterogeneous Indexing. Indexing is key to managing data, including managing data protection as well as storing, searching, restoring, and purging data. Multiple indexing modules are implemented in the illustrative backup system, using various indexing technologies and methodologies for tracking backed up data of different kinds. Any number of transaction logs can be generated from a given storage operation, such as backup and/or restore. In some embodiments, transaction logs are stored locally at the media agent host for use as working copies. In some embodiments, these transaction logs are preserved in backup by being stored to the storage device(s) that comprise corresponding backup data. Additionally, load balancing features optimize performance among indexing modules and/or their computing hosts without administrative intervention. Some embodiments exploit the ability of the illustrative backup system to employ multiple indexing modules as a use case for index/catalog replication.

Each illustrative index/catalog comprises information from various transaction logs generated in the backup system, e.g., generated from multiple storage operations, generated by multiple media agents, and/or generated by multiple backup systems (e.g., storage operation cells). In addition to facilitating transitions during failovers, the index/catalog enables backed up data to be found, browsed, restored, and/or further processed. Moreover, the index/catalog provides a certain level of granularity, such as identifying individual files within a backup copy based on content and/or metadata searches.

In some embodiments, transaction logs are collected and stored "as is" into a repository from which they can be recalled and processed as needed, but they are not incorporated and/or organized into an index/catalog. An association between each storage job and corresponding transaction logs enables all backup data in the storage job to be recovered. This approach does not offer the granularity of an index/ catalog, but is useful for avoiding the relatively high cost of implementing indexing hosts when source data is not suitable for granular indexing, and/or when recovering all backup data together from a given job meets the customer's needs. In some embodiments, transaction logs in the repository are recovered later and incorporated into one or more index/catalogs.

Index/catalog data structures are, in some embodiments, managed and stored separately within the illustrative backup system and are not necessarily stored with the backed up data, though the invention is not so limited. One or more index/catalogs in the illustrative backup system reside on computing devices that are specially configured for performing indexing functions ("indexing hosts"), e.g., they are equipped with powerful processors, a relatively large main memory, and relatively high-speed cache/mass storage. These indexing hosts operate separately from computing devices that host media agent modules, which handle storage operations, but the invention is not so limited and in some embodiments, an indexing host comprises both indexing capabilities and media agent module(s), e.g., a "media agent/indexing host."

Multiple Index/Catalogs of Different Types. Heterogeneous indexing involves the use of multiple diverse index/catalogs in the illustrative backup systems. In some embodiments, an indexing host comprises multiple types of indexing technologies for generating and maintaining respective index/catalogs. When the indexing is performed by software that executes on the indexing host, the software may be referred to herein as an "indexing module." Different indexing modules execute on the same and/or on distinct indexing hosts, without limitation. Examples of indexing technologies include ctree, Apache solr, elasticsearch, etc., without limitation. The resulting index/catalog is illustratively referred to as a ctree index/catalog, solr index/catalog, elasticsearch index/catalog, respectively. In some embodiments, the indexing technology is a database management system, such as Microsoft SQL, MySQL, SQLite, etc., without limitation, resulting in an index/catalog that is organized around a database schema, e.g., SQL index/catalog, MySQL index/catalog, SQLite index/catalog, respectively, without limitation. Illustratively, structured database index/catalogs are used for tracking backups of database data and, in some embodiments, are organized according to a schema that is compatible with and/or mimics in whole or in part the schema in the source data being backed up.

Thus, the illustrative backup system uses any number of indexing hosts, each indexing host generating and maintaining one or more diverse index/catalogs and/or in the case of a media agent/indexing host, also performing storage operations by a resident media agent. Illustratively, indexing preferences such as a policy or other criteria govern when an index/catalog is to be backed up and where the backed up index/catalog is to be stored.

Indexing preferences are part of system preferences and are stored at one or more of: a storage manager, a management database associated with the storage manager, the indexing host, and/or another component of the backup system, without limitation. Backup schedules for indexes generally operate independently, e.g., asynchronously, at different times, autonomously, etc., of when storage operations generate backup data, even when a media agent co-resides with indexing module(s) on the same media agent/indexing host. For example, the backup system may perform a first storage operation generating backup data at a first time, update one or more index/catalogs using transaction log data associated with the storage operation at a second time, and, at a later third time, may perform a second storage operation to back up the one or more index/catalogs; data and index/catalogs backed up during the first and second storage operations may be stored on the same or on different storage devices according to preferences. In some embodiments, preferences indicate which storage operations should trigger an index/catalog backup operation, e.g., after a full backup, after a synthetic full backup, after a reference copy is created, after a data restore operation, etc. The illustrative backup system is configured to recover index/catalogs from index/catalog backup copies and/or by recovering transaction logs that were stored with backup data. For example, an index/catalog may be restored from a backup copy of the index/catalog made at a first point-in-time and then further updated by parsing data from and/or "playing back" stored copies of transaction logs from storage operations performed after the first point-in-time.

Illustratively, transaction logs are stored to backup storage along with a corresponding identifier of the storage operations and/or storage job (e.g., backup job, archive job, etc.) from which the transaction logs were generated. Typically, a storage job comprises a plurality of storage operations such as when a plurality of data files or a backup set of data are backed up. The illustrative index/catalogs also store an association between the storage job and the information in the transaction logs. Accordingly, all backup data generated in a certain storage job can be retrieved as needed using an index/catalog.

Preferably, transaction logs are generated in a format that is not specific to a particular type of index/catalog or indexing technology, so that one or more index/catalogs can incorporate the information in the transaction logs. For example, XML is used in some embodiments of the transaction logs. XML is then consumed and interpreted by an appropriate indexing host(s) and indexing module(s) when incorporating the transaction log information into each respective index/catalog.

Selecting a Suitable Index Among Diverse Index/Catalogs. Indexing preferences generally associate each data source with a type of indexing technology and/or with an index/catalog and/or with a computing device that hosts the target index/catalog for tracking backup data generated from the source data. The illustrative backup system comprises rules that are used in storage operations for selecting which index/catalog receives transaction logs. The rules are included in system preferences, illustratively in the management database associated with the storage manager. The storage manager instructs the media agent assigned to the storage operation where to transmit transaction logs, e.g., to one or more indexing hosts and/or their respective index/catalogs. In other embodiments, rules for choosing which index will track a particular data subclient and/or backup set are stored in each media agent. In other embodiments, the rules reside at the data agents and/or in databases associated therewith that initially process data for backup before the data reaches the media agent, and the data agent illustratively instructs the media agent. Thus, indexing destinations are defined granularly and flexibly in reference to the source data, for example at the subclient level or as associated with other sets of data under management by the system such as backup sets.

Preferably, rules for determining which type of index/catalog tracks a given data source favor choosing solr technology (alternatively, elasticsearch) for data sources that are relatively rich in metadata, such as Microsoft OneDrive web-based file hosting and synchronization, Microsoft SharePoint web-based collaborative platform incorporating Microsoft Office applications, Microsoft Exchange mail server and calendaring service, Google Drive web-based file storage and synchronization service, and/or other like applications, etc. When the data source is a file system or network attached storage, which is relatively metadata-poor compared to the above-mentioned sources, the illustrative rules favor choosing ctree indexing technology. When the data source is a structured database (e.g., managed by a database management system, such as an Oracle database), the illustrative rules favor SQL database technology or the like. For example, file system data from a certain source device (e.g., storage device 102, client computing device, etc.) is assigned to a first ctree index/catalog on a first indexing server, whereas database data from the same source is assigned to an SQL index/catalog on the first indexing server or on a second indexing server, without limitation. These examples are merely illustrative, and the invention is not so limited. Accordingly, diverse types of source data are indexed to diverse index/catalogs.

The illustrative architecture of the backup system contemplates not only the use of multiple index/catalogs and different kinds of indexing technology associated with different data sources, but further contemplates tiered or multi-step indexing applied to the same data source. For example, a given subclient (grouping of data) and/or backup set (grouping of subclients) is backed up at a first time, thus generating a first set of transaction logs that are incorporated into a first index of a first kind, e.g., file system data indexed into a ctree index, without limitation. Further backups of the same data source are updated into the same index/catalog comprising metadata from the transaction logs. A separate round of content indexing is applied to all or part of the backup data, which results in a separate content index of a second kind, e.g., a solr index, without limitation. Thus, the indexing technology is tailored to the kinds of data being indexed.

When a user searches for backup data in the illustrative backup system, the searching infrastructure directs the search to a metadata index/catalog when the sought-after information is in the nature of metadata. When the sought-after information is in the nature of data contents (e.g., words, phrases, specially formatted alphanumeric strings such as Social Security numbers, image content, etc.), the searching infrastructure directs the search to a second (content) index/catalog. Thus, in some embodiments, multiple indexes cover the same underlying data at different levels of granularity; and in other embodiments indexes do not overlap, because different data types are tracked by distinct index/catalogs.

Load Balancing of Backup and Indexing Resources—Migration Jobs. In some embodiments, the backup system includes features for load balancing among the computing devices that host media agents and/or index/catalogs. Illustratively, so-called "catalog migration jobs" transfer all or part of an index/catalog from one host to another. Illustrative "media agent migration jobs" transfer media agent modules from one host to another, e.g., to offload a host for indexing. Catalog migration jobs are not necessarily used for failover, i.e., when a component fails and/or when a backup job is interrupted, and are used at other times to ensure a smooth re-allocation of resources and to provide improved performance in the backup system on an ongoing basis without administrator intervention. For simplicity, catalog migration jobs and media agent migration jobs are referred to hereinafter as "migration jobs."

The illustrative backup system determines usage patterns of media agent modules, indexing modules, and/or their host computing devices. Trending analysis predicts growth in usage, e.g., using time series analysis from past history. Each host computing device receives a usage rating based on historical analysis and further based on predicted future usage, e.g., optimal, light, warning, or overload rating. The illustrative migration job re-associates data sources with a different destination media agent and/or index/catalog, including transferring some or all relevant transaction logs and/or indexing information from the old host to the new host. When a next storage operation is initiated, the new associations are applied so that the new host performs the duties formerly assigned to the old host, e.g., data backups performed by a new media agent and/or indexing performed by a new indexing module. In some embodiments, existing storage operations are suspended to allow for the migration job to complete and are then resumed at the new host. Later, if the new host becomes overloaded, another migration job load balances again among components. When no suitable host can be found to take on re-assignments from an overloaded host, alarms raised to administrators indicate that additional resources are needed.

The illustrative migration job runs at a suitable time, e.g., daily, weekly, based on trigger criteria/thresholds, etc., without limitation, and preferably runs separately from and independently of any schedules for data backup. Illustratively, the storage manager manages data collection and analysis for triggering migration jobs, and the collected data are stored in the management database associated with the storage manager and/or at a separate metrics server. This approach enables global analysis and management across the backup system, and even across storage operation cells, triggering migration jobs as needed. In some embodiments, some of the historical data is collected and stored at the host of the media agent and/or index/catalog and obtained from there by the storage manager.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF THE PREFERRED EMBODIMENTS

As will be seen from the disclosure herein, certain embodiments of systems and methods are provided for enabling failover during a backup operation. In particular, embodiments of the invention include creating a catalog, or index, of individual objects or files within backup data on a storage device. Inventive systems can also include media agent modules, or other backup components, that further generate a set of transaction logs that identify metadata with respect to new data objects being stored to the backup device. A copy of the index/catalog and transaction logs can be stored at a location accessible by multiple media agent modules. As a result, if one media agent fails during a backup operation, a second media agent can access the transaction logs and the existing index/catalog to resume the backup operation without requiring a restart of the backup process. Such embodiments can also provide means for enabling load balancing or like rotation of media agent modules in completing a common backup operation.

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the invention and not to limit the scope of the disclosure.

In addition, methods and functions described herein are not limited to any particular sequence, and the acts or blocks relating thereto can be performed in other sequences that are appropriate. For example, described acts or blocks may be performed in an order other than that specifically disclosed, or multiple acts or blocks may be combined in a single act or block.

Figure 1:
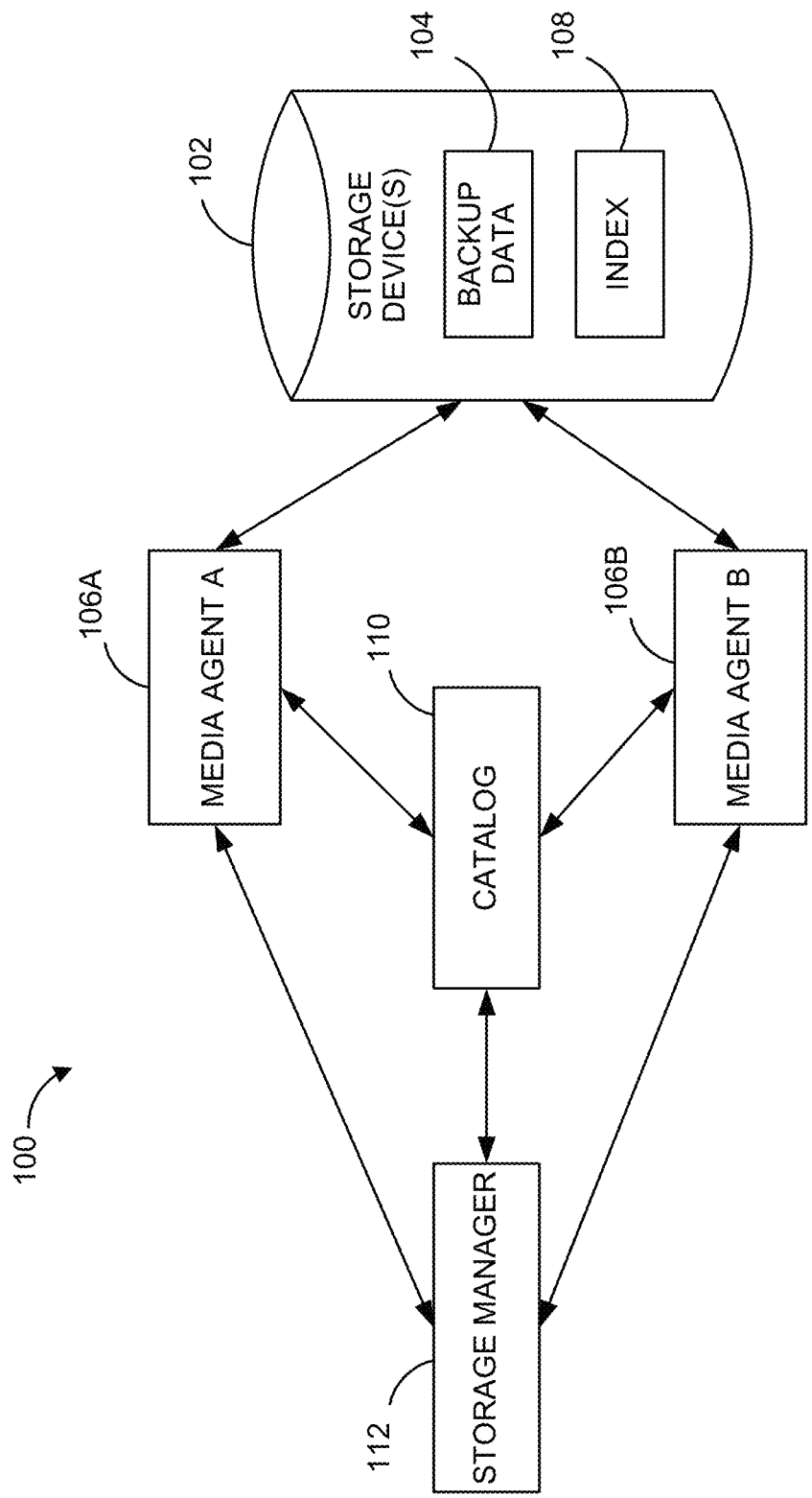
FIG. 1 illustrates a block diagram of a backup system 100 according to certain embodiments of the invention.

FIG. 1 illustrates a block diagram of a backup system 100, according to certain embodiments of the invention. In general, the backup system 100 comprises a modular (or tiered) architecture that provides for failover during a backup operation. For example, the backup system 100 can maintain a central catalog, or index, and one or more transaction logs usable to identify and/or restore backup data on a storage device.

As shown, the backup system 100 comprises at least one storage device 102 for storing backup data 104. The storage device 102 may include any type of media capable of storing electronic data, such as, for example, magnetic storage (such as a disk or a tape drive), optical media, or other type of mass storage. In certain embodiments, the storage device 102 can be part of a storage area network (SAN), a Network Attached Storage (NAS), a virtual machine disk, combinations of the same or the like.

In certain embodiments, the storage device(s) 102 may be implemented as one or more storage "volumes" that include physical storage disks defining an overall logical arrangement of storage space. For instance, disks within a particular volume may be organized as one or more groups of redundant arrays of independent (or inexpensive) disks (RAID). In certain embodiments, the storage device(s) 102 may include multiple storage devices of the same or different media.

Storage of the backup data 104 to the storage device 102 is performed by media agent modules or devices 106A and 106B (collectively referred to by reference numeral "106"). In general, the media agent devices 106 comprise storage controller computers that serve as intermediary devices and/or means for managing the flow of data from, for example, client information stores to individual storage devices. For instance, the media agent 106 can comprise a module that conducts data between one or more source devices, such as a client computing device, and the storage device(s) 102.

In certain embodiments, the media agents 106 store the backup data 104 on the storage device 102 as a plurality of data chunks. The terms "chunk" and "data chunk" as used herein are broad terms and are used in their ordinary sense and include, without limitation, a portion of data having a payload and encapsulated with metadata describing the contents of the payload placed in a tag header of the chunk. In certain embodiments, a chunk represents the smallest restorable component (e.g., 512 megabytes) of an archive or backup file.

In certain embodiments, the media agent 106 is communicatively coupled with and controls the storage device 102. For example, the media agent 106 may instruct the storage device 102 to use a robotic arm or other means to load or eject a media cartridge, and/or to archive, migrate, or restore application-specific data. In certain embodiments, the media agent 106 communicates with the storage device 102 via a local bus, such as a Small Computer System Interface (SCSI) adaptor. In some embodiments, the storage device 102 is communicatively coupled to the media agent 106 via a SAN.

Each media agent 106 can further maintain an index cache that stores index data generated during backup, data migration/relocation, and restore operations as further described herein. Such index data provides the backup system 100 with an efficient and intelligent mechanism for locating backed up objects and/or files during restore or recovery operations. For example, the index data can include metadata such as file/object name(s), size, location, offset, checksum and the like of backup data 104 stored on the storage device 102. The index cache is illustratively configured at the computing device that hosts the media agent 106.

Once a backup operation is complete, the index data is generally stored as an index 108 with the data backed up to the storage device 102. This advantageously facilitates access to the files and/or objects within the backup data when performing a restore operation. However, with conventional backup systems, in the event that there is a failure during backup of the data 104, a complete and accurate representation of the backed up data is not stored on the storage device 102. Thus, such failures oftentimes result in a restarting of the backup process and a re-creation of the index data.

To provide for failover during backup operations, the media agents 106 of the backup system 100 are further configured to generate one or more transaction logs for each data chunk backed up to the storage device 102. Such transaction logs can maintain similar information as entries of the index 108 (e.g., object name, size offset, length, checksum, time stamp, combinations of the same or the like). Once a particular data chunk is committed to, or stored on, the storage device 102, the corresponding transaction log(s) are uploaded or transmitted on-the-fly to a main index, or catalog, 110.

The catalog 110, in certain embodiments, represents a copy of the most recent index 108 stored with the backup data 104 on the storage device 102. Like the index 108, the catalog 110 entries contain sufficient information to restore one or more files or blocks from the last completed backup operation. When used in combination with uploaded transaction logs, the catalog 110 can be advantageously used to resume a backup operation that terminates prematurely or otherwise interrupted, such as from a failure of a media agent 106.

The catalog 110 is advantageously accessible to each of the media agents 106 such that if a first media agent (e.g., media agent 106A) fails while performing a backup operation, a second media agent (e.g., media agent 106B) can access the catalog 110 and resume the backup operation in place of the first media agent. For instance, in certain embodiments, the catalog 110 can be stored on a server or other computing device (e.g., indexing server) separate from the media agents 106. In yet other embodiments, the catalog 110 can be maintained by a storage manager 112. It will also be appreciated that catalog 110 can represent a computing device, such as a server computer, that maintains the catalog or index.

In certain embodiments, the storage manager 112 comprises a module or application that coordinates and controls storage, data migration/relocation, recovery and/or restore operations within the backup system 100. For instance, such operations can be based on one or more storage policies, schedules, user preferences or the like. As shown, the storage manager 112 can communicate with each of the media agents 106 and the catalog 110. In yet further embodiments, the storage manager 112 can communicate with the storage device(s) 102.

Although the backup system 100 is shown and described with respect to particular arrangements, it will be understood from the disclosure herein that other embodiments of the invention can take on different configurations. For instance, the backup system 100 can comprise a plurality of media agent modules or devices that each communicate with one or more storage devices and/or one or more client devices.

Furthermore, components of the backup system 100 can also communicate with each other via a computer network. For example, the network may comprise a public network such as the Internet, virtual private network (VPN), token ring or TCP/IP based network, wide area network (WAN), local area network (LAN), an intranet network, point-to-point link, a wireless network, cellular network, wireless data transmission system, two-way cable system, interactive kiosk network, satellite network, broadband network, baseband network, combinations of the same or the like.

Figure 2:
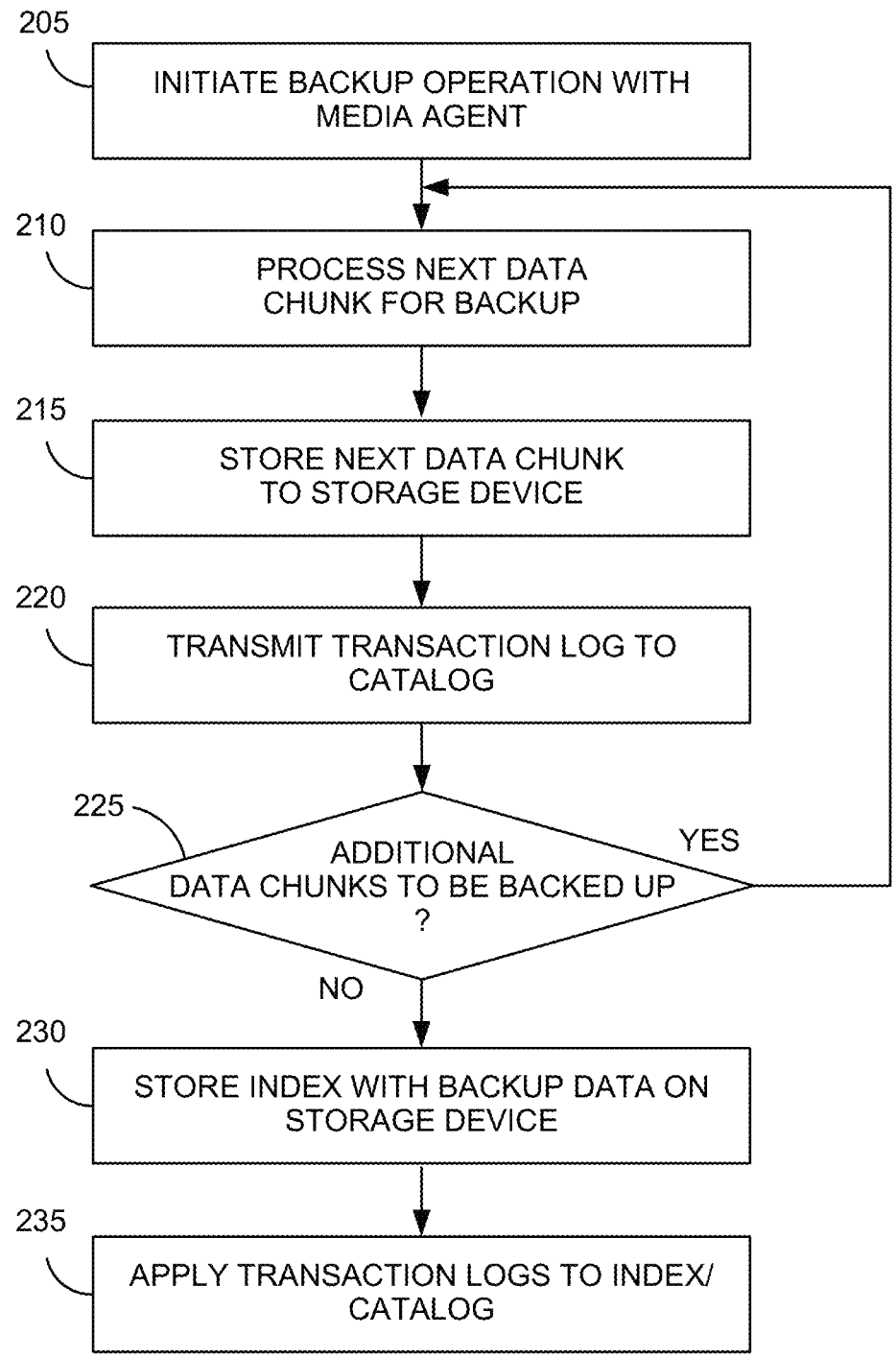
FIG. 2 illustrates a flow chart of an exemplary embodiment of a catalog creation process usable by the backup system of FIG. 1.

FIG. 2 illustrates a flow chart of a catalog creation process 200 according to certain embodiments of the invention. For instance, the process 200 can be advantageously used to maintain a catalog or main index of metadata usable to restore backed up data and resume a backup operation following a premature failure of a backup component. For exemplary purposes, the process 200 will be described with reference to the components of the backup system 100 of FIG. 1.

At Block 205, the process 200 begins a backup operation performed by a media agent device 106. For example, the storage manager 112 may instruct the media agent device 106 to back up data relating to one or more applications executing on one or more client computing devices. As discussed, in certain embodiments, the media agent 106A stores the backup data 104 on the storage device 102 in a chunk-by-chunk manner.

In certain embodiments, the media agent device 106 receives the data to be backed up from one or more data agents operating on a client device. In certain examples, the data can comprise application-specific data or can include data streams with multiple data types or objects contained therein.

At Block 210, the media agent device 106 processes a data chunk of the received data to be backed up. In certain embodiments, such processing includes generating metadata indicative of the contents and/or attributes of the objects within the data chunk or of the data chunk itself, as well as information regarding the storage location of such objects or files on the storage device 102 (e.g., with the backup data 104).

The media agent device 106 then backs up the data chunk to the backup file 104 on the storage device 102 (Block 215). The media agent device 106 also uploads one or more transaction logs to the catalog 110 that contain the above-described metadata for the backed up data chunk (Block 220). In certain embodiments, a single transaction log corresponds to a single data chunk.

At Block 225, the process 200 determines if there are additional data chunks as part of the backup operation. If so, the process 200 returns to Block 210 to process the next data chunk. If not, the process 200 proceeds with Block 230 to store the index 108 with the backup data 104. In certain embodiments, the index 108 allows for restoring individual objects and/or files from the backup data 104. The process 200 also includes applying the uploaded transaction logs to the catalog 110 so that the catalog 110 contains up-to-date information reflecting the contents of the entire backup file 104 (Block 235).

It will be appreciated that the process 200 is not limited to the arrangement of blocks illustrated in FIG. 2. For example, in other embodiments, the transaction log(s) may be uploaded (Block 220) prior to, or concurrent with, the storage of the corresponding data chunks on the storage device 102.

Figure 3:
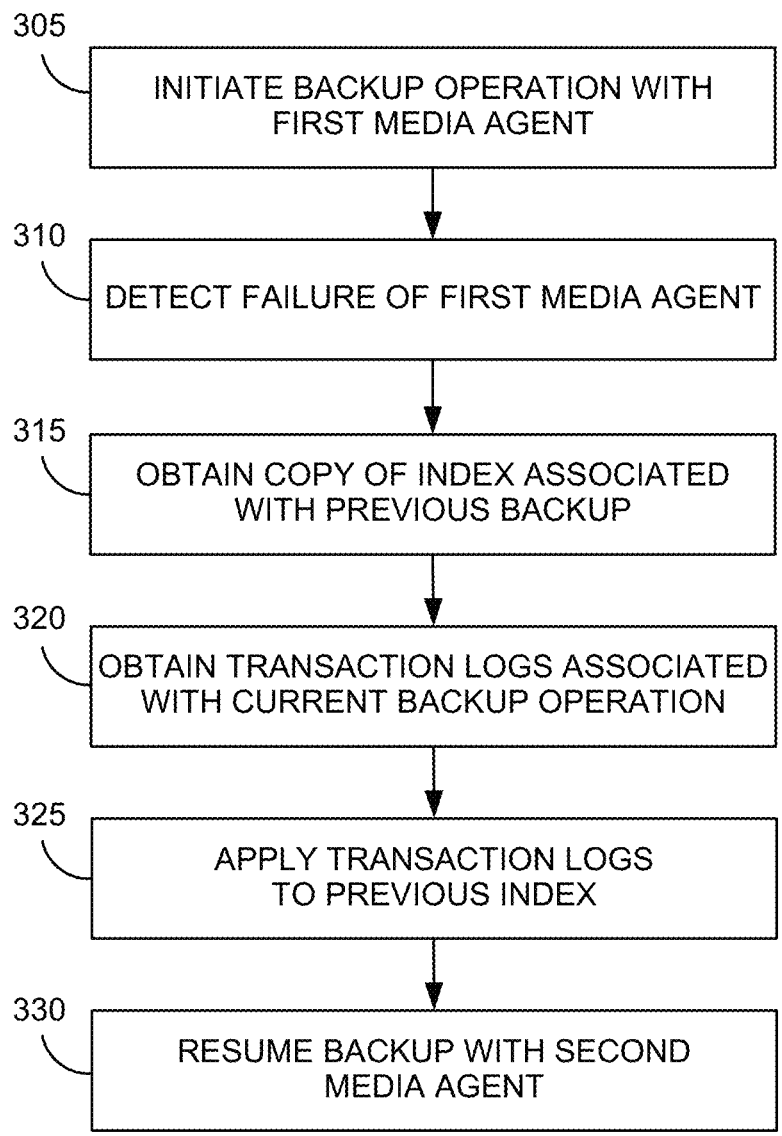
FIG. 3 illustrates a flow chart of an exemplary embodiment of a failover backup process usable by the backup system of FIG. 1.

FIG. 3 illustrates a flow chart of a failover backup process 300 according to certain embodiments of the invention. For instance, the process 300 can be used to transfer control of a backup operation from a first storage controller component to a second storage controller component, such as during a failure or for load balancing. In certain embodiments, the process 300 illustrates a failover method that is possible in a system utilizing the catalog creation process 200 of FIG. 2. For exemplary purposes, the process 300 will be described hereinafter with reference to the components of the backup system 100 of FIG. 1.

The process 300 begins at Block 305 by initiating a backup operation with the first media agent 106A. At Block 310, the process 300 detects a failure of the first media agent 106A. For instance, in certain embodiments, the storage manager 112 can detect that the first media agent 106A has prematurely ceased performing the backup operation. In one embodiment, the failure of the first media agent 112 causes the backup operation to fail, and during the next system restart, the storage manager 112 detects the failure of the first media agent 106A.

Upon detecting failure of the first media agent 106A, the process 300 obtains a copy of the index associated with the last complete backup (Block 315). For example, the storage manager 112 can instruct the second media agent 106B to retrieve a copy of the index 108 from the storage device 102, the catalog 110 (or a computing device maintaining the catalog 110) or the like. In certain embodiments, the retrieved index contains information for retrieving objects and/or files that were stored on the storage device 102 prior to the commencement of the current backup operation (e.g., the most recently completed full backup).

At Block 320, the second media agent 106B also retrieves a copy of the transaction log(s) associated with the interrupted backup operation by the first media agent 106A. In certain embodiments, the transaction logs are stored on the catalog server 110 as a result of Block 220 of the process 200. For instance, the storage manager 112 may instruct that the transaction logs be sent to the second media agent 106B along with instructions to the second media agent 106B to take over the interrupted backup operation.

At Block 325, the second media agent 106B applies the transaction logs to the retrieved index to the point that reflects where in the backup process the first media agent 106A failed. The second media agent 106B is then able to resume the backup operation without needing to repeat the backup of data that was performed by the first media agent 106A (Block 330). For instance, the second media agent 106B can continue backing up the data according to the process 200 depicted in FIG. 2.

Although the process 300 has been described with respect to detecting a failure of a media agent device, other embodiments of the invention can utilize similar steps to achieve load balancing or other selective use of multiple media agents during a single backup operation. For example, at Block 310, the storage manager 112 or other component can determine if the first media agent 106A is operating under unbalanced and/or excessive load. Such an embodiment allows for the second media agent 106B to take over the backup operation prior to a failure of the first media agent 106A. For instance, the storage manager 112 can monitor bandwidth usage, a jobs queue and/or a schedule of the first media agent 106A to evaluate its load.

In certain embodiments of the invention, the backup operations disclosed herein can be used to copy data of one or more applications residing on and/or being executed by a computing device. For instance, the applications may comprise software applications that interact with a user to process data and may include, for example, database applications (e.g., SQL applications), word processors, spreadsheets, financial applications, management applications, e-commerce applications, browsers, combinations of the same or the like. For example, in certain embodiments, the applications may comprise one or more of the following: MICROSOFT EXCHANGE, MICROSOFT SHAREPOINT, MICROSOFT SQL SERVER, ORACLE, MICROSOFT WORD and LOTUS NOTES.

Moreover, in certain embodiments of the invention, data backup systems and methods may be used in a modular storage management system, embodiments of which are described in more detail in U.S. Pat. No. 7,035,880, issued Apr. 5, 2006, and U.S. Pat. No. 6,542,972, issued Jan. 30, 2001, each of which is hereby incorporated herein by reference in its entirety. For example, the disclosed backup systems may be part of one or more storage operation cells that includes combinations of hardware and software components directed to performing storage operations on electronic data. Exemplary storage operation cells usable with embodiments of the invention are described in U.S. Pat. No. 7,454,569, issued Nov. 18, 2008, which is hereby incorporated herein by reference in its entirety.

Figure 4:
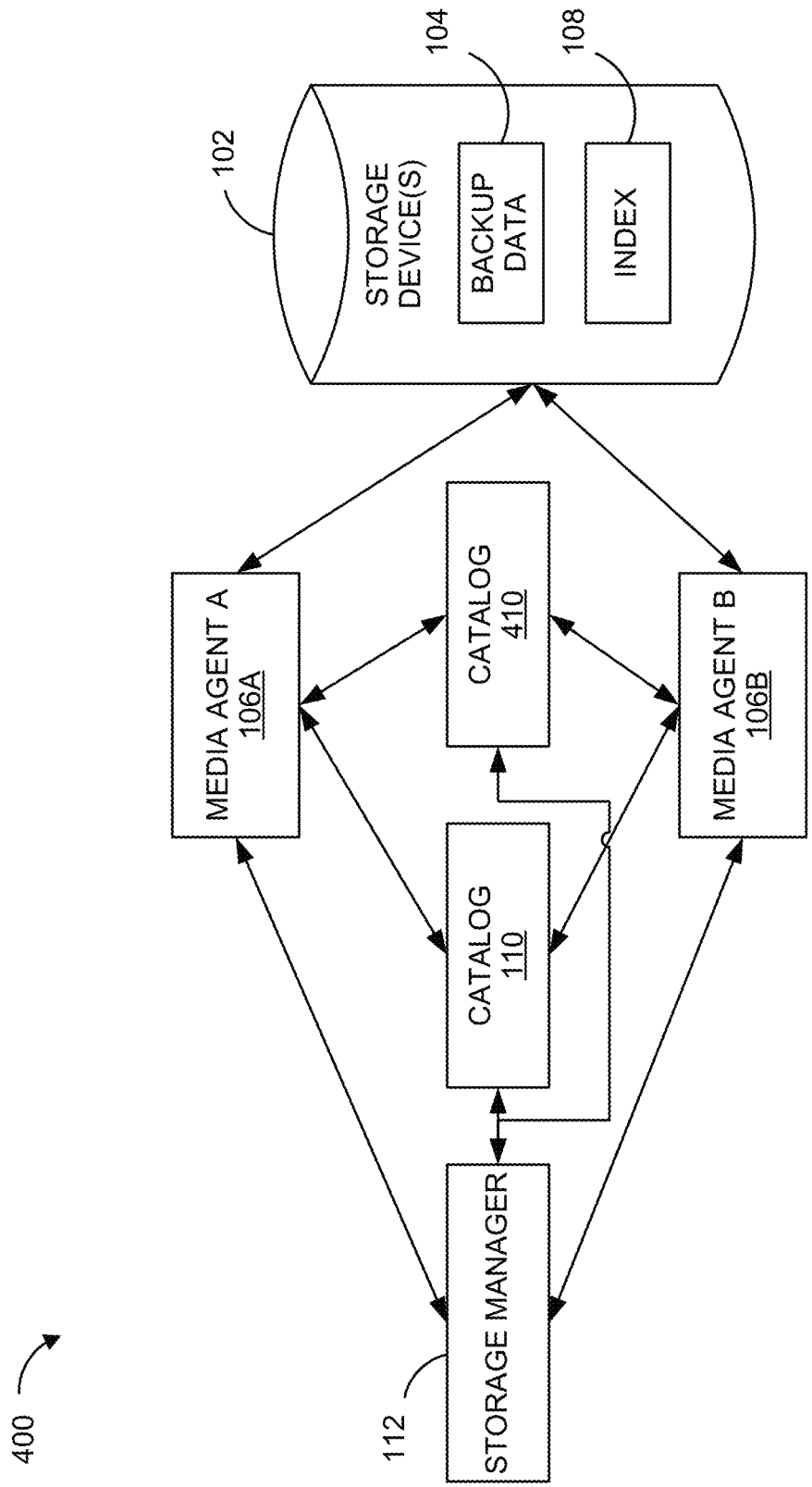
FIG. 4 illustrates a block diagram of a backup system 400 comprising heterogeneous indexing according to certain embodiments.

FIG. 4 illustrates a block diagram of a backup system 400 comprising heterogeneous (diverse) indexing according to certain embodiments. FIG. 4 depicts the same components as FIG. 1, plus index/catalog 410. Backup system 400 is analogous to backup system 100 and further comprises a plurality of index/catalogs, including index/catalog 110 and index/catalog 410. Illustratively index/catalog 410 is analogous to but of a different type than index/catalog 110, thereby illustrating heterogeneous (diverse) indexing. For example, index/catalog 110 is a ctree index, whereas index/catalog 410 is a solr index, and another index/catalog (not shown in the present figure) is of yet another type, e.g., SQL database, without limitation. As described in further detail elsewhere herein, each index/catalog is generated and maintained by an associated indexing module, which is configured to process transaction logs according to specific indexing algorithms to generate the resultant index/catalog. See, e.g., FIG. 6. In some embodiments, a ctree-type of indexing module generates and maintains a plurality of ctree index/catalogs, each ctree index/catalog associated with a certain granular data source (e.g., a subclient grouping of data), as described in more detail in FIG. 10.

Like index/catalog 110, index/catalog 410 is a data structure comprising information sufficient to locate and restore data backed up in earlier storage operations—so long as those storage operations were indexed to index/catalog 410. Like index/catalog 110, index/catalog 410 is in communication with storage manager 112 and with one or more media agents 106 (e.g., media agents 106A and 106B). Illustratively, each index/catalog is stored and maintained in cache memory at the host computing device, e.g., 506, 520. The amount of cache memory used by a given index/catalog is used in some embodiments as criteria for migrating the index/catalog to another host.

In contrast to a single centralized "main" index/catalog 110 as envisioned in FIG. 1, heterogeneous indexing means that information in one index/catalog, e.g., 110, is not necessarily present in another index/catalog of a different type, e.g., 410. Illustratively, different data sources are indexed to different index/catalogs, largely depending on the type of data source. Therefore, contents of index/catalogs 110 and 410 will differ accordingly.

Figure 5:
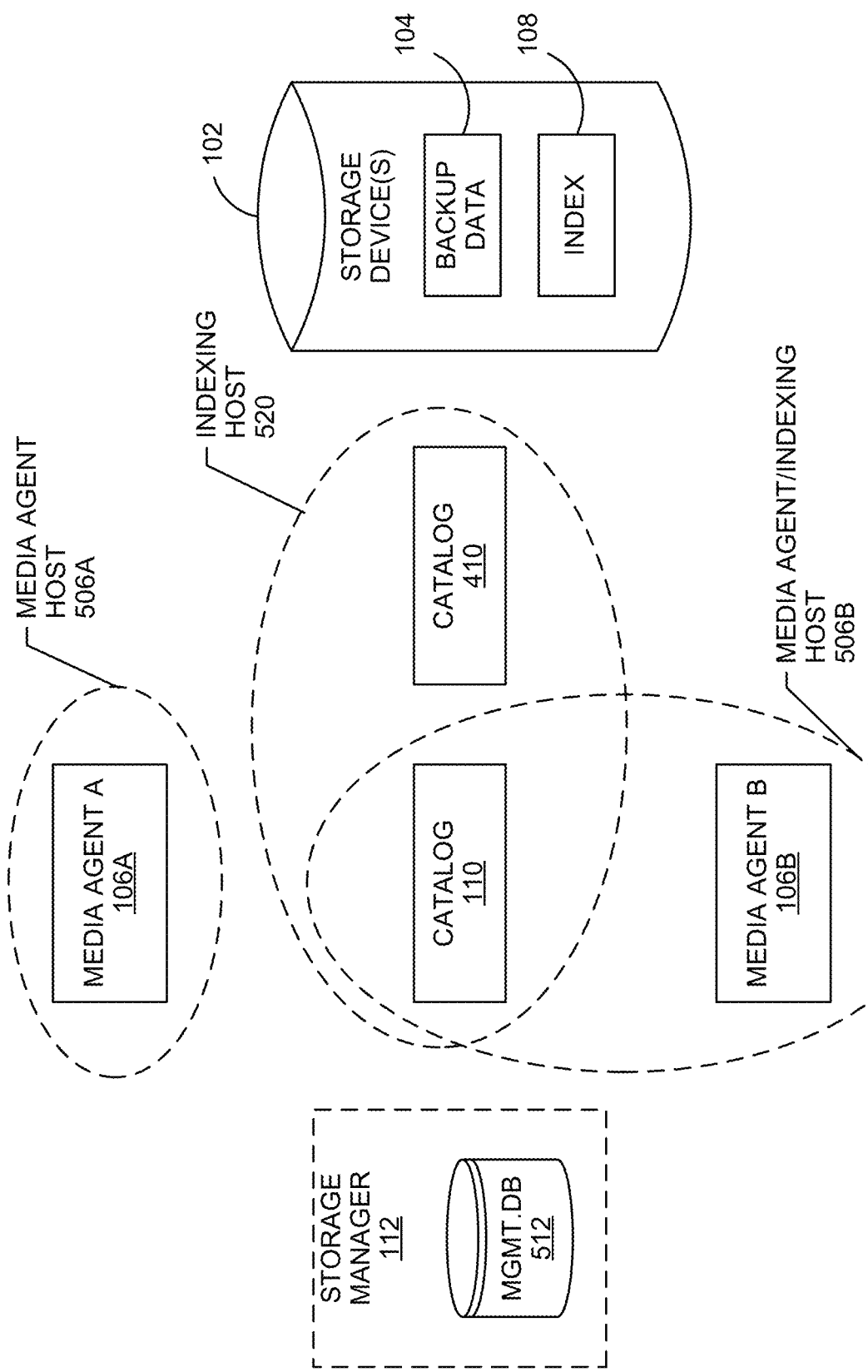
FIG. 5 illustrates a block diagram depicting certain configuration details of backup system 400.

FIG. 5 illustrates a block diagram depicting certain configuration details of backup system 400. This figure depicts various hardware configurations that could be implemented in system 400 as depicted in FIG. 4. To ease the reader's understanding, the communication pathways depicted by arrows in FIG. 4 are not shown in the present figure. FIG. 5 depicts the same components as FIG. 4, plus: media agent host 506A comprising/hosting media agent 106A; media agent/indexing host 506B comprising/hosting media agent 106B and index/catalog 110; management database 512 as a logical component of storage manager 112; and indexing host 520 comprising catalog 110 and catalog 410. Depicted hosts 506A, 506B, 520, as well as storage manager 112, each comprises one or more hardware data processors and associated computer memory for executing computer instructions as noted elsewhere herein.

Management database 512 is a logical, but not necessarily a physical, component of storage manager 112. Management database stores system preferences and status information about storage operations that occurred (or failed) system 100/400.

Each host computing device (e.g., 520, 506A, 506B) comprises one or more hardware data processors and computer memory for storing program instructions, cache memory, and optionally mass storage resources. Illustratively, index/catalogs 110, 410 are stored in cache memory at the host computing device. Indexing host 520 and media agent/indexing host 506B both are shown hosting index/catalog 110 in this figure to illustrate alternative embodiments.

In a given embodiment, index/catalog 110 is configured in one of host 520 OR host 506B, but not both. In a migration job, index/catalog 110 migrates from host 520 to host 506B or vice-versa for load balancing purposes, e.g., migrating to a more lightly loaded host. More details are given in other figures herein. There is no limit to the number of distinct indexing hosts 520 in the illustrative backup systems. Illustratively, indexing hosts operate mutually independently. Thus, a first indexing host performs its functions asynchronously and autonomously relative to a second indexing host, regardless of whether the type of indexing technology used (e.g., ctree, solr, SQL, etc.) is the same or different.

Figure 6:
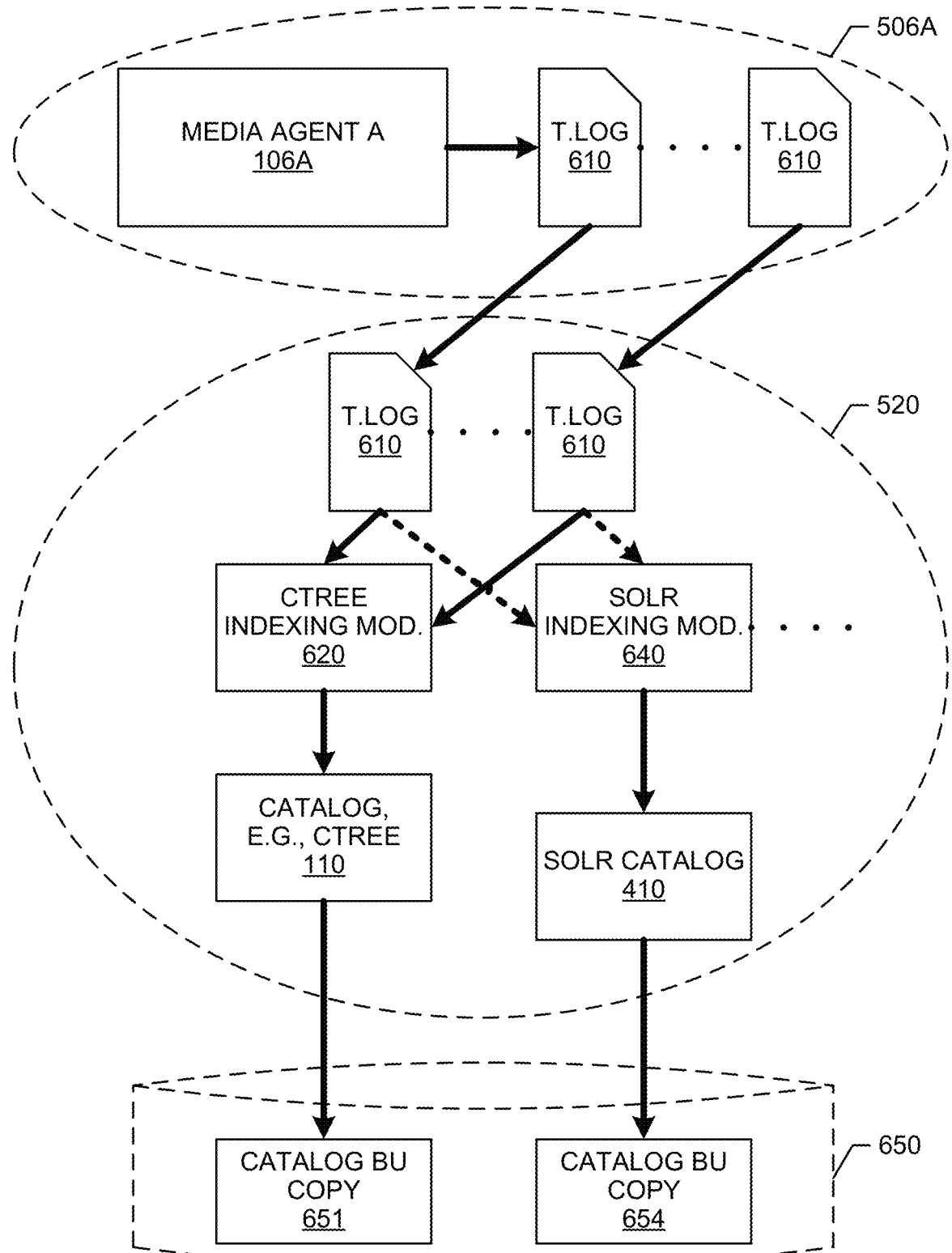
FIG. 6 illustrates a block diagram depicting more details of backup system 400 and exemplary logical data flows therein.

FIG. 6 illustrates a block diagram depicting more details of backup system 400 and exemplary logical data flows therein. FIG. 6 depicts: media agent host 506A comprising/hosting media agent 106A and transaction logs 610; indexing host 520 comprising transaction logs 610; ctree indexing module 620; solr indexing module 640; index/catalog 110; index/catalog 410; and one or more data storage devices 650 for storing index/catalog backup copies 651 and 654. The arrows depict logical data flows.

Transaction logs 610 are described in more detail elsewhere herein and are generated by media agents performing storage operations, e.g., backup operations performed by media agent 106A, without limitation. Illustratively, any number of transaction logs 610 can be stored at indexing server 520, received from any number of media agents 106 in system 400. In some embodiments, transaction logs 610 are received from systems outside system 400 and added to indexing server 520.

A plurality of indexing modules are illustratively installed on, configured, and hosted by indexing server 520, including indexing modules 620 and 640, and others depicted by the dots emanating from module 640, without limitation. Illustratively, indexing module 620 performs ctree indexing by processing one or more transaction logs 610, and resulting in ctree index/catalog 110. Illustratively, indexing module 640 performs solr indexing by processing one or more transaction logs 610 (not necessarily the same transaction logs processed by module 620), resulting in solr index/catalog 410. Illustratively, another indexing module (not shown here) performs SQL database indexing by processing one or more transaction logs 610 (not necessarily the same transaction logs processed by modules 620/640), resulting in a corresponding SQL index/catalog (not shown here). As noted elsewhere herein, the types of indexing modules and the corresponding index/catalogs they generate and maintain are diverse and more numerous than what is depicted in the present figure. In some embodiments, multiple indexing modules of the same type co-exist in the system, whether on the same or different indexing hosts. Different embodiments will implement different types of indexing modules depending on the nature of the source data whose backups are indexed.

Each index/catalog (e.g., 110, 410, etc.) is backed up at one or more suitable times. Criteria for backing up each index/catalog may vary among the various types of index/catalogs, but in some embodiments will be the same throughout system 400. Illustratively, index/catalog 110 is backed up to one or more copies 651. Illustratively, index/catalog 410 is backed up to one or more copies 654. Catalog backup copies 651 and 654 are shown here stored to the same data storage device 650, but the invention is not so limited. In some embodiments, backup copies 651 and 654 are stored to different data storage devices. In some embodiments data storage 650 is the same as data storage device 102, which stores backup data 104, as shown in FIGS. 1 and 4. As noted elsewhere herein, preferably the timing of index/catalog backup jobs differs from the timing of when backup data 104 is generated.

The arrows depict logical data flows. The dotted arrows in host 520 from transaction logs 610 to solr indexing modules 640 indicate that every transaction log 610 does not necessary go to every indexing module. In some embodiments all transaction logs 610 transmitted to a first indexing module are also transmitted to another like indexing module that generates a replication index of the first—see FIG. 10.

Figure 7:
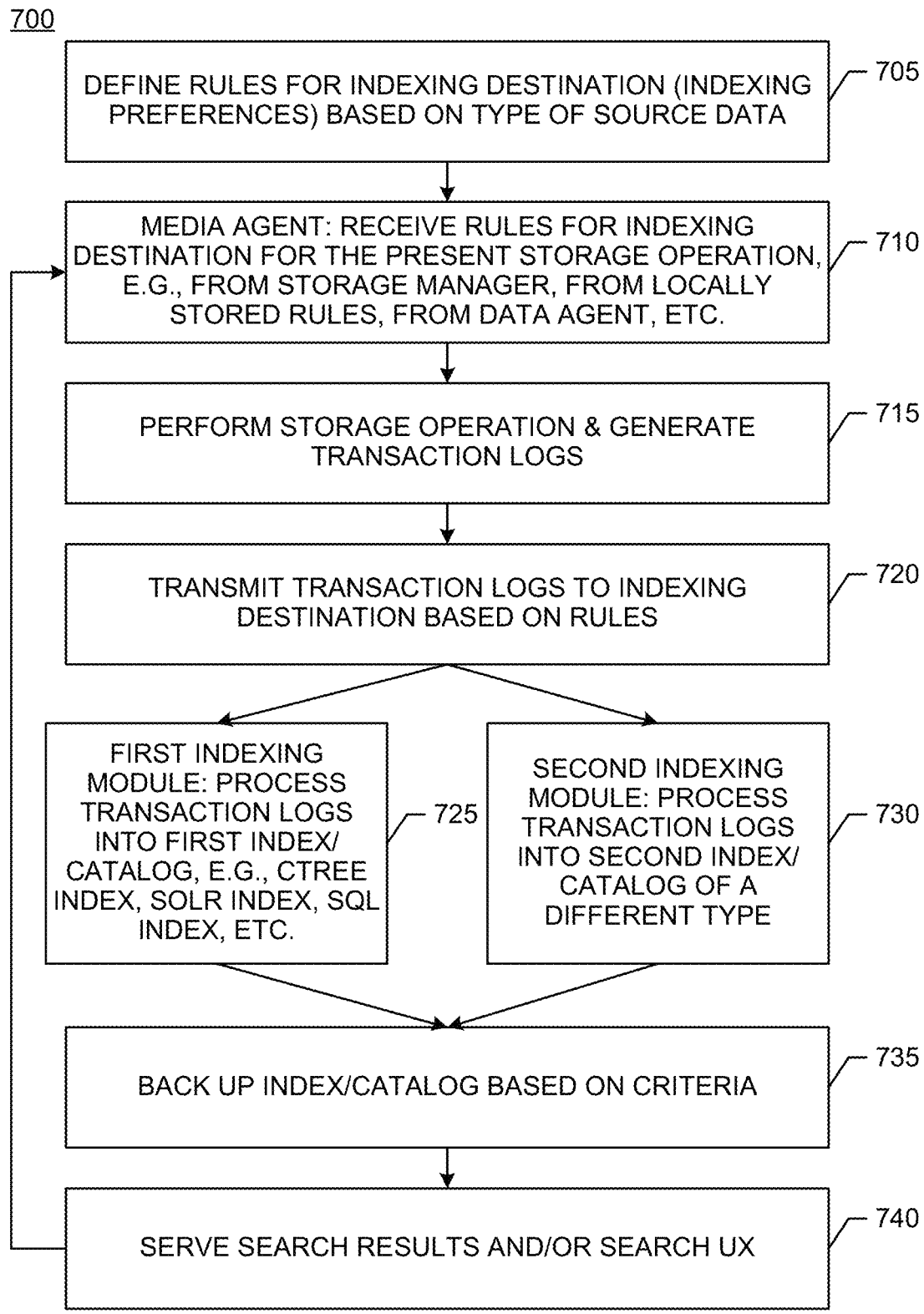
FIG. 7 illustrates a flow chart of an exemplary process 700 for using heterogeneous indexing in backup system 400.

FIG. 7 illustrates a flow chart of an exemplary process 700 for using heterogeneous (diverse) indexing in backup system 400. Process 700 is executed by one or more components of system 400, e.g., storage manager 112, media agent 106, one or more indexing modules 620, 640, etc.

At block 705, rules for deciding indexing destination(s) are defined. Illustratively, the rules (indexing preferences) are stored in management database 512. In some embodiments, the rules are defaulted into system preferences and do not require administration. The rules define different indexing technologies and/or destinations for various data sources in system 400, illustratively through the use of storage policies that indicate how source data sets are to be treated. For example, a storage policy for a data source that is a file system indicates that a first index/catalog (e.g., ctree type) is the indexing destination for the data source, e.g., 110; alternatively the storage policy indicates that a first indexing technology (e.g., ctree, etc.) is to be used for the data source; alternatively the storage policy indicates a host computing device (e.g., 506B, 520) is the indexing destination, predicated on the host determining a suitable indexing module (e.g., 620, 640) for processing transaction logs for the data source. For example, a storage policy for a data source that is metadata-rich (e.g., OneDrive, SharePoint, Exchange, etc.) indicates that a second index/catalog (e.g., solr type, elasticsearch type, etc.) is the indexing destination for the data source, e.g., 410; alternatively the storage policy indicates that a second indexing technology (e.g., solr, elasticsearch, etc.) is to be used for the data source; alternatively, a host (e.g., 520) is indicated. For example, a storage policy for a data source that is a structured database managed by a database management system (e.g., Oracle) indicates that another index/catalog (e.g., database type) is the indexing destination; alternatively the storage policy indicates that a third indexing technology (e.g., Oracle DBMS, etc.) is to be used for the data source; alternatively, a host (e.g., 520) is indicated.

At block 710, the media agent (e.g., 106A, 106B) that handles storage operations (e.g., backups, archiving, etc.) for a given data source receives the aforementioned rules (indexing preferences). In some embodiments, they are received from storage manager 112, e.g., one-time transmission, transmitted with instructions for starting every storage operation/job, such as when storage manager 112 triggers a backup operation for a given data source. In some embodiments, the rules (indexing preferences) are received from a data agent operating on a client device with access to the source data. In some embodiments, the rules (indexing preferences) are received from the indexing destination itself, e.g., indexing module 620, 640, etc. or from its host computing device, e.g., 106B, 520, etc. In some embodiments the rules (indexing preferences) are programmed/ configured into media agent 106, and are thus obtained locally from system configurations.

At block 715, the storage operation (e.g., backup) is performed at least in part by media agent 106. In some embodiments, the media agent performs the operation in conjunction with a data agent operating on a client device with access to the source data. Media agent 106 generates one or more backup data 104 from the source data and further generates one or more transaction logs 610. Notably, completion of the storage operation does NOT depend on whether the generated transaction logs have been indexed. Rather, blocks 720, 725, and 735 occur asynchronously with block 715. Likewise, block 735 also is asynchronous with blocks 720, 725, and 735.

At block 720, media agent 106 determines a suitable indexing destination for the transaction logs 610 based on the rules (indexing preferences) received at block 710. Accordingly, media agent 106 transmits transaction logs 610 to the indexing destination, e.g., indexing host 520, media agent/indexing host 506B, etc. In embodiments where media agent 106 executes on the same host computing device as the destination indexing module, e.g., on a media agent/indexing host 506B, media agent 106 transmits transaction logs 610 locally to the indexing module. Control passes to block 725 for handling by a first indexing module, to block 730 for handling by a second indexing module, or to another block (not shown) for handling by another indexing module, without limitation. Preferably, after the media agent transmits transaction logs to an indexing destination (and/or to an as-is repository in some embodiments), media agent 106 purges the transaction logs from its local storage to make room for more transaction logs, but the invention is not so limited.

At block 725, a first indexing module, e.g., 620, 640, etc., processes the transaction logs received from the media agent. The processing extracts and applies the information (e.g., metadata) in the transaction logs into a corresponding index/catalog generated and maintained by the indexing module, e.g., 110, 410, etc. Thus, information from transaction logs from a storage operation such as a backup of certain source data is transformed into updates to an index/catalog that tracks metadata, which is associated with the source data, with the storage operation, and/or with results of the backup operation, such as backup data chunks. The type of indexing technology of the first indexing module, e.g., ctree, solr, elasticsearch, SQL, etc., determines the type (structure, organization, schema) of the resultant index/catalog. Control passes back to block 710 (not shown) for performing further storage operations having the same or different indexing preferences. Control also passes to block 735.

At block 730, a second indexing module, of a type that is different from the first indexing module in block 725, processes transaction logs received from media agent 106. As in block 725, the type of indexing technology of the second indexing module, e.g., ctree, solr, elasticsearch, SQL, etc., determines the type (structure, organization, schema) of the resultant index/catalog. Control passes back to block 710 (not shown) for performing further storage operations having the same or different indexing preferences. Control also passes to block 735.

At block 735, process 700 backs up one or more index/catalogs based on respective criteria. Illustratively, each index/catalog is backed up independently of other index/catalogs in system 400, based on respective criteria associated with the particular index/catalog. Illustratively, indexing preferences such as a policy or other criteria govern when an index/catalog is to be backed up and where the backed up index/catalog is to be stored. Illustratively, criteria are stored in management database 512 and storage manager 112 triggers the backup operation. Examples of criteria that trigger an index/catalog backup job include one or more of: a time of day; a number and/or certain types of storage operations performed upon data sources tracked by the index, e.g., back up the index/catalog after each full backup of a source file system, or back up the index/catalog after every other incremental backup of the source file system, etc.; a number of transaction logs as yet not applied to the index, i.e., keeping no more than a threshold number of unprocessed transaction logs; a system event such as an upgrade to one or more system components such as data agents, media agents, storage manager, media agent/indexing host; instructions received from another component, such as from a metrics server or from another storage system; on demand; etc., without limitation. Index/catalogs are backed up to the same or different storage devices than backup data according to preferences, e.g., storage device 102, storage device 650, etc. Each backup copy of an index/catalog (e.g., 651, 654, etc.) is associated with a point-in-time, and can be used at another time to restore the index/catalog.

At block 740, process 700 serves search results from one or more index/catalogs such as 110, 410, etc. Illustratively, a user interface operates in system 100/400 for enabling user searching of index/catalog entries. Illustratively a user interface is provided by a web console in communication with storage manager 112. Storage manager 112 processes user queries, including adding/populating additional information into each query, e.g., client information, etc., before directing the query to the various indexing hosts. According to some embodiments, the storage manager appoints one of the indexing hosts as the query manager, whereas in other embodiments an indexing host that hosts the most index/catalogs appoints itself the query manager. The query manager directs the query to other indexing hosts in the backup system. Each indexing host runs the query locally against one or more index/catalogs on the host and transmits results to the query manager. The query manager aggregates query results and transmits them to the user interface, e.g., at the web console, illustratively bypassing the storage manager.

Figure 8A:
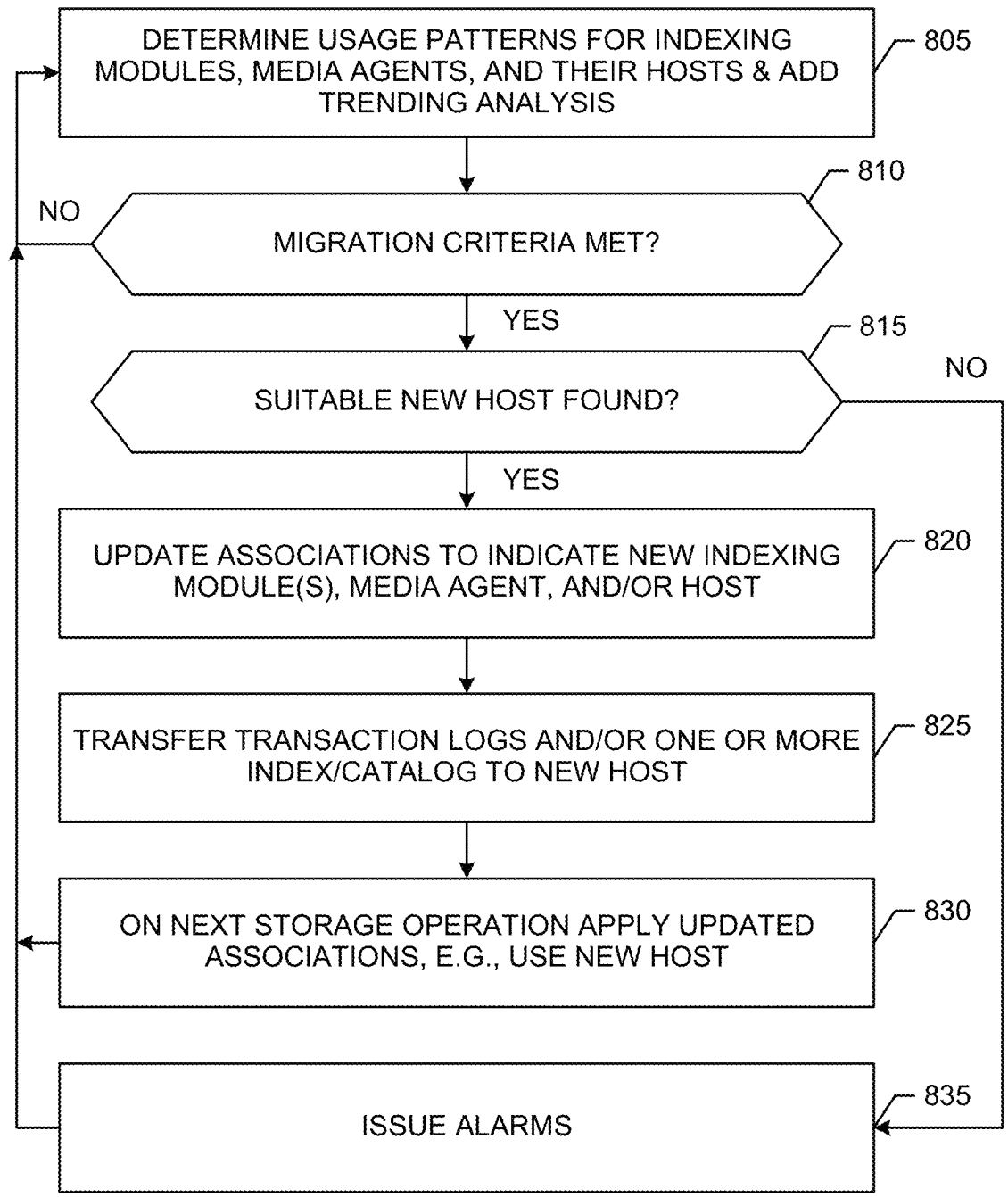
FIG. 8A illustrates a flow chart of an exemplary process 800A for performing a migration job in between storage operations in backup system 400.

FIG. 8A illustrates a flow chart of an exemplary process 800A for performing a catalog and/or media agent migration job in between storage operations, i.e., not while a storage operation is in progress, in backup system 400. In some embodiments, process 800A is implemented as a workflow that executes on storage manager 112, which orchestrates and manages the various steps in the workflow. Notably, migration jobs maintain load balancing in the illustrative system without administrator intervention. Some salient aspects of process 800A are depicted in FIG. 8A.

The backup system (e.g., using storage manager 112) illustratively determines usage patterns of media agent modules, indexing modules, and/or their host computing devices. Trending analysis predicts growth in usage, e.g., using time series analysis from past history. Each host computing device receives a usage rating based on historical analysis and further based on predicted future usage, e.g., optimal, light, warning, or overload rating. Disk usage is one exemplary factor for measuring load for a host, but the invention is not so limited. The illustrative migration job re-associates data sources (e.g., one or more subclients or backup sets) with a different media agent and/or different index/catalog, including transferring some or all relevant transaction logs and/or indexing information from the old host to the new host. The migration job also ensures that the changed associations are updated in system preferences. For example, the changed associations are transmitted to storage manager 112 or other system component, which updates the management database associated therewith, but the invention is not limited to this implementation. When a next storage operation is initiated, the new associations are applied so that the new host performs the duties formerly assigned to the old host, e.g., data backups performed by a new media agent and/or indexing performed by a new indexing module. In some embodiments (see FIG. 8B), existing storage operations are suspended to allow for the migration job to complete and are then resumed using the new host. Later, if the new host becomes overloaded (i.e., certain tracking metrics cause the host to be classified as "overloaded," or other migration criteria are met), another migration job is executed. When no suitable host can be found to take on re-assignments from an overloaded host, alarms are raised to administrators indicating that additional resources are needed.

At block 805, storage manager 112 determines usage patterns for several target components, including indexing modules (e.g., 620, 640), media agents (e.g., 106A, 106B), and/or their respective host computing devices (e.g., 506A, 506B, 520). In some embodiments, block 805 is limited to analyzing computing devices such as hosts 506A, 506B, and 520, without regard to operational characteristics of the software modules executing thereon, such as media agent modules and indexing modules. Usage patterns are generally based on information gathered in past operations. A trending analysis is added to predict usage needs for the next cycle of the respective component. The result is a rating e.g., optimal, light, warning, or overload. More details on block 805 are given in FIG. 9.

At block 810, which is a decision point, process 800A determines whether migration criteria have been met. If not, control passes back to block 805. If migration criteria are met, control passes to block 815. An illustrative load classification routine on storage manager 112 determines whether migration is needed from a first host to another host. This process follows the "load rule" below, illustratively for whether to migrate an index/catalog, i.e., for whether migration criteria are met:

If the host is rated LIGHT, keep using it;
If the host is rated OPTIMAL:
    If predicted load>predefined threshold, migrate to another host;
If host is rated WARNING:
    If trend is "rising" (trend>0): migrate to another host; and
If host is rated OVERLOADED, migrate to another host.

This rule set is shown here for illustrative purposes, but is not limiting on the invention. In other embodiments, other criteria are implemented. More exemplary details are given in the text that follows the description of FIG. 9.

At block 815, which is a decision point reached when migration criteria have been met, process 800A determines whether a new host computing device is available as the migration destination. If not, storage manager 112 raises alarms at block 835. If a new host is found, control passes to block 820.

At block 820, process 800A updates associations in system preferences, and in other suitable configurations, to indicate the new indexing modules, new media agents, and/or new host computing device. Storage manager 112 is illustratively responsible for executing the updates, but the invention is not so limited. For example, storage policies that previously specified a first indexing host now are updated to indicate the new indexing host. Likewise, storage policies that previously specified a first media agent or media agent host now are updated to indicate the new media agent and/or host, respectively. And so on.

At block 825, process 800A transfers transaction logs 610 and one or more index/catalogs (e.g., 110, 410, etc.) from a first host computing device (e.g., 506B, 520, etc.) to a second (destination) host computing device. Notably, the second host computing device need not be a never-before-used component in the system, and in some embodiments is already host to another media agent module and/or indexing module, without limitation. A suitable indexing module and/or media agent module also is activated at the destination (second) host. At this point, the pre-migration associations have been updated, the module has been readied for operation, and the migration job is complete.

At block 830, which is reached after the migration job is complete, on a next storage operation, the updated associations are applied and the new (second, destination) host computing device is used. This assures a smooth transition of resources.

At block 835, which is reached if new host computing device cannot be found to off-load a first host for which migration criteria have been met, storage manager 112 raises one or more alarms to notify administrators to take action. Except for block 835, no human intervention is required for the migration job of process 800A.

Figure 8B:
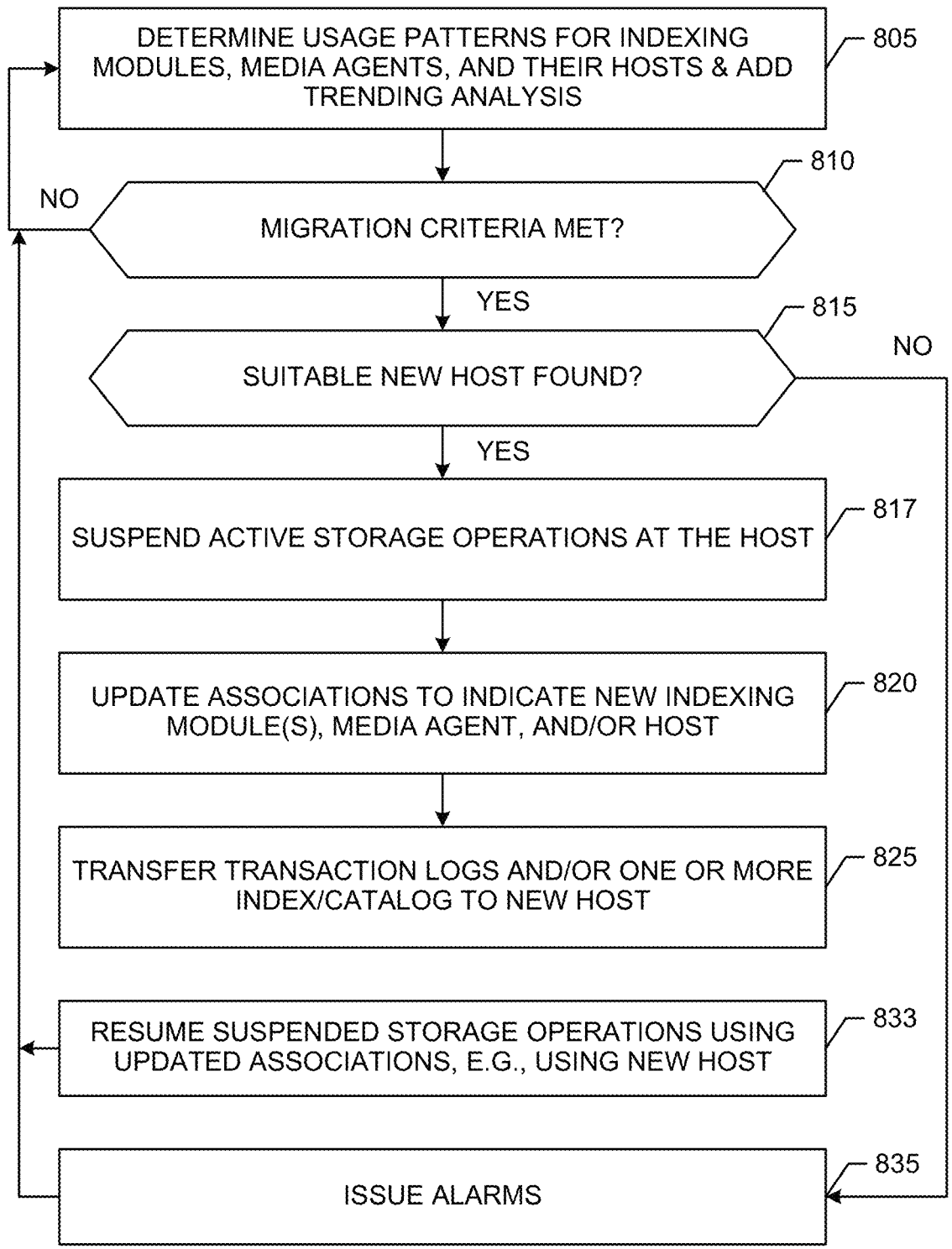
FIG. 8B illustrates a flow chart of an exemplary process 800B for performing a migration job when storage operations are in progress in backup system 400.

FIG. 8B illustrates a flow chart of an exemplary process 800B for performing a catalog and/or media agent migration job when storage operations are in progress in backup system 400. Blocks 805, 810, 815, 820, 825, and 835 are described in regard to process 800A in FIG. 8A. Scenarios where one media agent takes over for a failed media agent are described in regard to FIG. 3. The present process addresses scenarios where the catalog and/or media agent migration occurs, at least in part, while one or more storage operations are in progress, and the migration is triggered by migration criteria rather than by a media agent failure.

At block 817, which follows after a suitable migration destination host has been found at block 815, process 800B suspends active storage operations that make use of the component that is about to migrate, e.g., media agent, indexing module, host computing device. Illustratively, storage manager 112 triggers and manages the suspensions, e.g., instructing the components executing the storage operation (e.g., data agent, media agent, indexing module) to quiesce and/or pause until further instructed.

At block 833, which follows after the migration operation is completed at block 825, process 800B resumes the suspended storage operations using the new host computing device. Illustratively, storage manager 112 triggers and manages the resumptions, e.g., instructing the components involved in the storage operation to use the new host when resuming the storage operation. As a result, process 800B assures a smooth transition of resources without requiring storage operations in progress to begin anew. Except for block 835, no human intervention is required for the migration job of process 800B.

Figure 9:
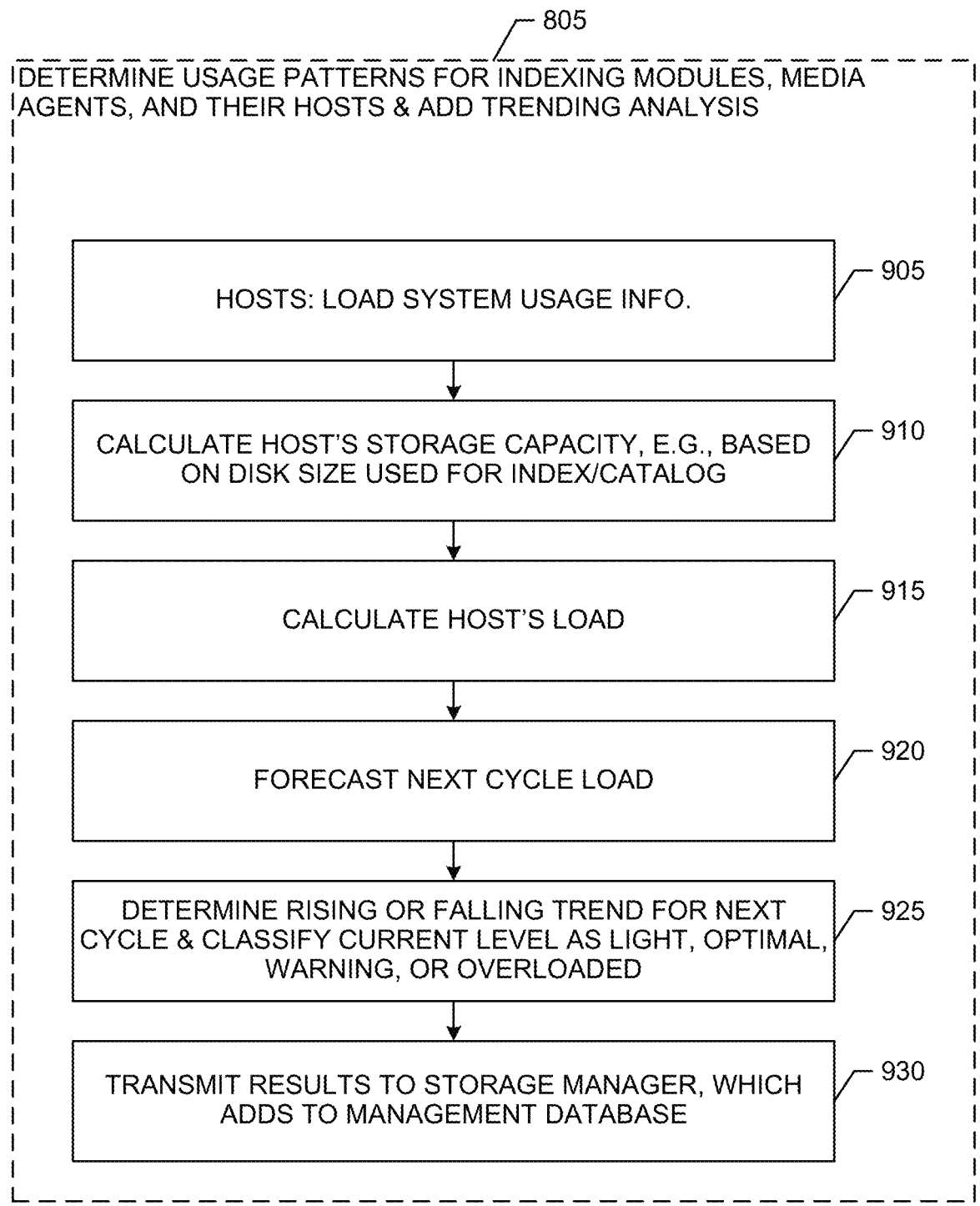
FIG. 9 illustrates certain salient details of block 805 in process 800A/800B.

FIG. 9 illustrates certain salient details of block 805 in process 800A/800B. Block 805 is generally directed at determining usage patterns and trends for certain components of system 100/400, such as media agent modules, indexing modules, and host computing devices thereof. Certain salient operations are depicted in the present figure. These operations are part of an illustrative workflow for executing a migration job. More exemplary details from the workflow are given below in the text that follows the description of the depicted blocks of FIG. 9.

At block 905, each host computing device (e.g., media agent host 506A, media agent/indexing host 506B, indexing host 520, etc.) loads its own system usage information into a routine that is part of block 805. Illustratively, this occurs once a day, but the invention is not so limited. System usage information is generally collected by the operating system and/or other utilities that run on the host computing device. These utilities are well known in the art.

At block 910, the host computing device calculates a storage capacity occupied by the index/catalog and/or transaction logs relative to local storage available on the host computing device. When too much of the local memory is used up by the index/catalog and/or transaction logs, the host computing device will tend to experience slower performance and risks running out of space altogether.

At block 915, the host computing device calculates one or more load statistics, e.g., CPU usage from resource monitor log file over a predefined past time period.

At block 920, the host computing device forecasts the load likely to occur based on a time-series statistical analysis, which is a technique well known in the art.

At block 925, the host computing device determines whether the time-series statistical analysis shows a rising or a falling trend; and further calculates a rating of Light, Optimal, Warning, or Overloaded based on the past data and the predicted next cycle load.

At block 930, the host computing device transmits these results (e.g., from blocks 905-925, without limitation) to storage manager 112, which stores the received results to management database 512 for future use.

In alternative embodiments, some or all the above-recited calculations are performed by storage manager 112 rather than by each host computing device.

Example Block 805 Operations. Additional illustrative details in reference to the operations of block 805 are given below. For example, and without limitation, once a day each active media agent host and/or indexing host starts the metrics calculation service, which loads the stored host's system data and calculates static, current, and forecasted metrics. With the metrics calculated, the host sends results to be stored and analyzed by the storage manager 112. In some embodiments, the calculations run at the storage manager 112. In some embodiments, the schedule for when the calculations are run is managed by the storage manager 112.

Illustrative Process at the Host Computing Device, e.g., 506A, 506B, 520, etc.

| | |
|---|---|
| Load Host System Information | Loads data from system and from resource monitor logs to calculate the metrics used by the storage manager to run a Load Balance algorithm. |
| Calculate Host Capacity | Calculate the capacity metric using the host's resources information. Illustratively, use just the Index Cache disk size to calculate a normalized value to represent the host's capacity. |
| Calculate Host Load | Calculate the current system load for the host, based on last system usage information obtained from the Resource Monitor log file. Index Cache disk usage is monitored and normalized between 0 and 1. |
| Forecast Next Cycle Load | Based on stored host data on Resource Monitor logs, calculate the last "N" days' load and with this value use a time-series statistical analysis to obtain the per-day next cycle load. |
| Classify Host | Determine whether the load trend for the next cycle follows a rising or falling pattern. Classify the host based on the current load and next cycle load: LIGHT, OPTIMAL, WARNING, and OVERLOADED for current load; and RISE or FALL for next cycle load trend. |
| Send Data To Storage Manager | The data obtained in this process are exported to the storage manager to be stored in the management database associated therewith. |

Exemplary Calculated Metrics. A value is calculated that represents the host based on its capacity and status in a way that can be measured and compared to other hosts. Metrics comprise:

"Capacity" (represented by C),
"Load" (represented by W),
"Load Class" (represented by M), and
"Next Cycle Trend" (represented by T).

Values are normalized between 0 and 1. The capacity value is calculated every time the load balance task starts, and is defined by the formula:

$$C = k_1 \times C_{disk} + k_2 \times C_{type}; \sum_{i=1}^{n} k_i = 1$$

Where:
$C_{disk}$: Disk capacity, normalized between 0 and 1 from 0 to the max size;
$C_{type}$: Disk type, 0 for none/unknown, 0.5 for HDD and 1 for SSD;
$k_n$: property weight, must sum to 1.

The load is obtained by getting the current status of the resources in the host computing device. Other features can be added to this analysis as long as we keep the k sum constraint.

Similar to the capacity, the load formula is defined by:

$$W = k_1 \times W_{disk}; \sum_{i=1}^{n} k_i = 1$$

Where:
$W_{disk}$: Disk usage, normalized between 0 and disk size;
$k_n$: property weight, must sum to 1.

The load class is obtained by the load value (W), using the following rule:
a. $0 \leq W \leq M_1$, then M=LIGHT;
b. $M_1 \leq W \leq M_2$, then M=OPTIMAL;
c. $M_2 \leq W \leq M_3$, then M=WARNING;
d. $M_3 \leq W \leq 1.0$, then M=OVERLOADED.

Where $M_1$ is an optimal threshold, $M_2$ a warning threshold and $M_3$ is an overload threshold.

Those values are defaulted to:

| | |
|---|---|
| M1 | 0.3 |
| M2 | 0.7 |
| M3 | 0.9 |

The next cycle trend is obtained by calculating the next cycle expected load using a time-series analyzer on the last "N" load figures and then checking if the forecasted load values are rising or falling. After obtaining the forecasted values, the value for k is calculated by counting each time whether the predicted load ($W_f$) is greater than the threshold defined for OPTIMAL ($M_2$). After that, the averages and load trend are calculated as follows:

$$\overline{W} = \frac{\sum_{i=1}^{n} Wi}{n}$$

$$\overline{W_f} = \frac{\sum_{i=1}^{n} Wfi}{N}$$

$$W_{trend} = 0.1 \times \frac{\overline{W_f} - \overline{W}}{\overline{W}}$$

The predicted capacity is calculated:

$$C_f = |C \times (1 - \overline{W_f}) - W_{trend}|$$

All data and/or results obtained in this process are illustratively sent to the storage manager for further load balance processing.

Forecasting the Next Cycle. Illustratively, in an exemplary embodiment, the forecasting is done by time-series model analysis, using data loaded from the resource monitor files. The forecasting is for "N" days, "N" being a configurable number of days to forecast a Next Cycle. The basic rule for forecasting is that the bigger the value of "N," the more historical data is needed for better precision. Default value for the next cycle is seven days. For that value we need at least one month of logged data to use.

Overload Event Message. Illustratively, if in the metrics calculation process the system detects that the host computing device is in WARNING or OVERLOADED state, an event message with critical severity is sent to the system administrator comprising the following information:

Host [identifier] is in [WARNING/OVERLOADED] state with load [load %]

Illustrative Load Table. The host computing device should store the collected data to the storage manager 112, comprising the following exemplary fields:

| COLUMN | TYPE | DESCRIPTION |
| --- | --- | --- |
| clientId | INT | media agent's ID from App_Client |
| capacity | FLOAT | media agent's Capacity at metrics calculation |
| load | FLOAT | media agent's load at metrics calculation |
| averageHistoryLoad | FLOAT | mean value for load history, calculated in host |
| averagePredictLoad | FLOAT | mean value for predicted load, calculated in host |
| classification | TINYINT | Host's load classification field, being: 1-LIGHT 2-OPTIMAL 3-WARNING 4-OVERLOADED |
| trend | FLOAT | Host's forecasted load trend |
| k | FLOAT | Host's relation of the number of forecasted values over (M2) by the total forecasted values (N) |
| predictedCapacity | REAL | Host's predicted capacity for next cycle |
| diskSizeMB | BIGINT | Host's Index Cache disk size in MB |
| freeSizeMB | BIGINT | Host's Index Cache disk free size in MB |
| timestamp | TIME_T | Metric's calculation date and time |

Illustrative Migration Table. The migration jobs use this exemplary table as reference for pending and running migration jobs:

| COLUMN | TYPE | DESCRIPTION |
| --- | --- | --- |
| id | INT | Migration index |
| indexId | INT | Index database affected by this migration (target) |
| fromClientId | INT | Source media agent ID, where the index database will be moved from |
| toClientId | INT | Target media agent ID, where the index database will be moved to |
| isMigrated | INT | Flag indicating if the migration was already done (>0) or it's still pending (=0), default value is 0 |
| jobId | BIGINT | Job ID that requested the migration |
| startTime | TIME_T | Timestamp indicating when the migration process started |
| endTime | TIME_T | Timestamp indicating when the migration process completed |

End of Example Operations in Block 805.

Figure 10:
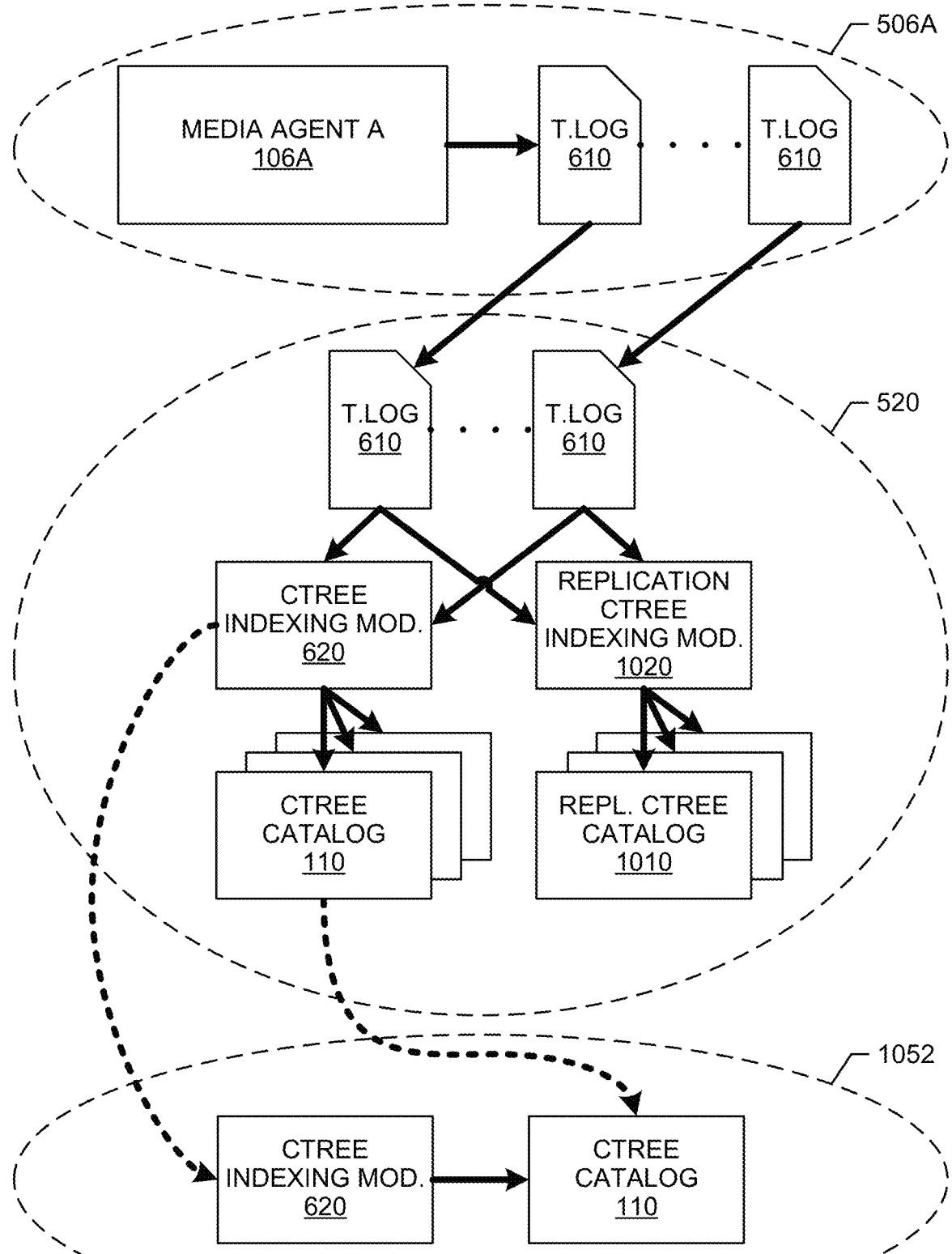
FIG. 10 illustrates a block diagram depicting a replication index and a migration job, including exemplary logical data flows.

FIG. 10 illustrates a block diagram depicting a replication index and a migration job, including exemplary logical data flows. FIG. 10 is analogous to FIG. 6, and additionally depicts replication. FIG. 10 depicts: a plurality of ctree index/catalogs 110 at indexing host 520; replication ctree indexing module 1020 and replication ctree index/catalogs 1010 at indexing module 520; and indexing host 1052 comprising ctree indexing module 620 and ctree index/catalog 110, which have migrated from indexing host 520 in a catalog migration job depicted by the dotted arrows. In this embodiment, each transaction log 610 destined for ctree indexing module 620 is also transmitted to replication ctree indexing module 1020.

Ctree indexing module 620 is depicted here creating and maintaining a plurality of ctree index/catalogs 110, in contrast to solr indexing module 640 in FIG. 6, which creates and maintains a logically unitary solr index/catalog 410. The present depiction shows the architecture of ctree indexing in the illustrative systems, which is conducted at a granular level, i.e., one ctree index per individual entity. Accordingly, a plurality of ctree index/catalogs 110 are created and maintained here, illustratively one per subclient (subclients are groupings of source data defined in system preferences, e.g., all data on a certain drive of a client computing device, all data in a file system, all data in a certain folder or set of folders, etc.). This pluralistic ctree indexing architecture is ideal for load balancing, whereby some but not necessarily all ctree index/catalogs 110 can migrate to another host computing device, e.g., to host 1052. In contrast, solr and other database index/catalogs, e.g., 410, are created and maintained in logically unitary fashion and, preferably, such unitary index/catalogs are not subdivided by catalog migration jobs. Accordingly, solr and database index/catalogs, e.g., 410, migrate as a whole, whereas ctree index/catalogs, e.g., 110, which are more granular, can migrate in subsets from one host to another.

Replication ctree indexing module 1020 is identical to ctree indexing module 620, but is configured as a replication resource, i.e., as a standby resource for disaster recovery. Although module 1020 is depicted here operating on the same host computing device 520 as the "live" module 620, preferably module 1020 operates on another host computing device that is readily available if host 520 fails, e.g., in a cloud computing account distinct from host 520, in the same or another data center, on a virtual machine distinct from host 520, etc. In some embodiments, both module 620 and module 1020 are configured in the same or distinct cloud computing accounts, so that host 1020 can take over from host 520 in a disaster recovery scenario as a failover destination.

Replication ctree index/catalogs 1010 are generated and maintained by module 1020, based on transaction logs 610. Index/catalogs 1010 are identical to their counterpart index/catalogs 110 generated and maintained by module 620. Index/catalogs 1010, like module 1020, are intended as failover resources and preferably are stored in a distinct host computing device apart from the host of "live" indexing module 620.

Indexing host 1052 is a host computing device, distinct from host 520, that is configured to be a destination for catalog migration jobs such as the one depicted here by the dotted arrows. Illustratively, ctree indexing module 620 migrates to host 1052 in a catalog migration job. In some embodiments, module 620 actually moves from host 520 to host 1052, i.e., no longer operates at host 520, but in other embodiments a second module 620 is activated to operate at host 1052 while the first module 620 continues operating at host 520, e.g., generating index/catalogs 110 for unmigrated subclients. Preferably, the catalog migration job includes transferring existing index/catalogs 110 for the migrating subclients so that existing and future index/catalogs for a given subclient reside at the same host e.g., host 1052. In another catalog migration job (not shown here), a reverse migration causes ctree indexing module 620 and ctree index/catalogs 110 to migrate from host 1052 back to host 520 or to another host computing device based on changed conditions that trigger the migration job.

In regard to replication, any type and any number of index/catalogs, e.g., 110, 410, etc., can be replicated to a respective counterpart using a corresponding replication indexing module (not shown here). Thus, in some embodiments, solr index/catalogs 410 are replicated by a replication solr indexing module, database index/catalogs are replicated by replication database indexing module(s), ctree index/catalogs 110 are replicated by replication ctree indexing module 1020, etc. and/or any combination thereof.

In regard to catalog migration, any type and any number of index/catalogs, e.g., 110, 410, etc., can be migrated to any number of other host computing devices, e.g., 506A, 506B, 520, 1052, etc. In some embodiments, when a new media agent host computing device is brought online in an illustrative backup system, storage manager 112 triggers a catalog migration analysis to determine whether criteria are met for launching catalog migration job(s) to the newly operational host computing device. Thus, the illustrative backup systems keep themselves load balanced on an ongoing basis without administrator intervention, unless new host computing resources are needed. After new host computing resources are added, the illustrative backup systems evaluate load balancing needs and launch migration jobs(s) accordingly.

In regard to the figures described herein, other embodiments are possible within the scope of the present invention, such that the above-recited components, steps, blocks, operations, messages, requests, queries, instructions, and/or responses are differently arranged, sequenced, sub-divided, organized, and/or combined. In some embodiments, a different component may initiate or execute a given operation and/or store certain data.

Example Embodiments. Some example enumerated embodiments of the present invention are recited in this section in the form of methods, systems, and non-transitory computer-readable media, without limitation.

According to an exemplary embodiment, a method comprises: by a first media agent executing on a first computing device, generating first backup data from a first data source, wherein the first computing device comprises one or more hardware processors; by the first media agent, storing the first backup data to one or more storage devices that are communicatively coupled to the first media agent; by the first media agent, generating one or more first log files, wherein the one or more log files are based on one or more of: the generating of the first backup data and the storing of the first backup data, and wherein the one or more log file comprise information for locating the first backup data at the one or more storage devices; by the first media agent, transmitting the one or more first log files to a first index that is configured to enable restoring backup files generated by at least the first media agent, including restoring first backup files from the first backup data; and wherein the first index is updated by applying the one or more first log files to the first index. The above-recited method further comprising: migrating the first media agent from the first computing device to a second computing device, wherein an association between the first backup data and the first media agent is updated to indicate that the first media agent resides at the second computing device; and by the first media agent executing at the second computing device, restoring an individual data file from the first backup data based on using the first index. The above-recited method wherein the first index is maintained at a second computing device that is distinct from the first computing device, and wherein the second computing device comprises one or more hardware processors; and wherein the first index is backed up when index-backup criteria are met that are distinct from a timeframe for the generating of the first backup data. The above-recited method further comprising: by the first media agent, storing the one or more first log files to at least one of: the first computing device, and a second storage device associated with the first computing device, wherein the second storage device is distinct from the one or more storage devices where the first backup data is stored. The above-recited method wherein the transmitting of the one or more first log files to the first index is at a first time after a storage operation that generated the first backup data has completed.

The above-recited method wherein the first index is maintained at a second computing device that is distinct from the first computing device, and wherein the first index is one of a first plurality of indexes maintained at the second computing device using ctree indexing technology; wherein after the first index migrates to a third computing device that is distinct from the second computing device, at least one other of the first plurality of indexes remains at the second computing device and is maintained thereon by the ctree indexing technology; and wherein the first index is maintained at the third computing device by a ctree indexing technology that executes at the third computing device. The above-recited method further comprising: migrating the first index from a second computing device to a third computing device, wherein an association between the first backup data and the first index is updated to indicate that the first index resides at the third computing device. The above-recited method wherein the first index is based on a first type of indexing technology, and wherein the first index is associated with the first data source, and further comprising: by the first media agent, transmitting second log files to a second index that is based on a second type of indexing technology that differs from the first type, wherein the second log files are based on generating second backup data from a second data source, and wherein the second index is updated by applying the second log files to the second index, and wherein the second index is associated with the second data source. The above-recited method wherein the first media agent is configured to choose between the first index and the second index based on a type of data source being backed up. The above-recited method wherein a storage manager instructs the first media agent to transmit the first log files to the first index and to transmit the second log files to the second index based on one or more preferences that govern a choice of index, and wherein the storage manager comprises one or more hardware processors. The above-recited method wherein a first data agent that transmits data to the first media agent for generating the first backup data instructs the first media agent to transmit the first log files to the first index; and wherein a second data agent that transmits data to the first media agent for generating the second backup data instructs the first media agent to transmit the second log files to the second index.

According to another exemplary embodiment, a storage system comprises: a first computing device comprising one or more hardware processors and computer memory; a second computing device comprising one or more hardware processors and computer memory; wherein the first computing device is configured to: at a first time, perform a first backup operation that generates first backup data from a first data source, stores the first backup data to one or more storage devices that are communicatively coupled to the first computing device, and generates first log files, and at a second time, transmit the first log files to a first index for tracking backup data generated by at least the first computing device, including the first backup data; and wherein the second computing device is configured to: use a first indexing technology to update the first index by applying the first log files to the first index, and at a third time, after applying the first log files to the first index, cause the first index to be backed up to a backup index. The above-recited system further comprising: wherein the second time is after the first backup operation completes. The above-recited system wherein the first index is backed up when index-backup criteria are met that are distinct from a timeframe for performing the first backup operation. The above-recited system wherein the first index is one of a plurality of indexes in the system, and wherein each index in the plurality of indexes is maintained by a respective indexing module using a respective type of indexing technology, and wherein each indexing module is associated with one or more data sources. The above-recited system further comprising: a third computing device comprising one or more hardware processors and computer memory, wherein the third computing device is configured to: determine that one or more criteria for migration are met by the second computing device that comprises the first index, based at least in part on an amount of storage space occupied by the first index, and cause the first index to migrate from the second computing device to a fourth computing device, wherein an association between the first backup data and the first index is updated to indicate that the first index resides at the fourth computing device.

The above-recited system wherein the first index is one of a first plurality of indexes maintained at the second computing device using ctree indexing technology; wherein after the first index migrates to the fourth computing device, at least one other of the first plurality of indexes remains at the second computing device and is maintained thereon by the ctree indexing technology; and wherein the first index is maintained at the fourth computing device by a ctree indexing technology that executes at the fourth computing device. The above-recited system wherein the first index is generated using a first indexing technology; and wherein the first computing device is further configured to: transmit second log files to a second index which is maintained by a second indexing technology of a different type from the first indexing technology, wherein the second log files are based on generating second backup data from a second data source, wherein the second indexing technology is associated with the second data source, and wherein the second index is updated by applying the second log files to the second index. The above-recited system wherein preferences in the system govern a choice of index based on a type of data source, and further comprising: a third computing device comprising one or more hardware processors and computer memory, wherein the third computing device is configured to: instruct the first computing device to transmit the first log files to the first index based on the preferences that govern the choice of index for the first data source, and instruct the first computing device to transmit second log files to a second index based on backing up a second data source, wherein the first data source is of a different type from the second data source, wherein the first index is of a first type associated with the first data source, and wherein the second index is of a second type associated with the second data source. The above-recited system wherein the second computing device is further configured to: by the first media agent, restore an individual data file from the first backup data based on using the first index.

According to an illustrative embodiment, a method of generating, storing, and restoring backup data comprises: generating first backup data from a first data source, by a first media agent executing on a first computing device, wherein the first computing device comprises one or more hardware processors; by the first media agent, storing the first backup data to one or more first storage devices; by the first media agent, generating one or more first log files based on the generating and the storing of the first backup data; by the first media agent, storing the one or more first log files to the one or more first storage devices; by the first media agent, transmitting the one or more first log files to a first index of a first type, wherein the first type is associated with the first data source, and wherein the first index is updated by applying the one or more first log files to the first index. The above-recited method further comprising: by the first media agent, transmitting second log files to a second index of a second type that differs from the first type, wherein the second log files are based on generating second backup data from a second data source, wherein the second type is associated with the second data source, and wherein the second index is updated by applying the second log files to the second index. The above-recited method wherein the first index is maintained at a second computing device that is distinct from the first computing device, and wherein the first index is backed up when index-backup criteria are met that are distinct from a timeframe for the generating of the first backup data; and wherein the second computing device comprises one or more hardware processors. The above-recited method further comprising: by the first media agent, storing the one or more first log files to at least one of: the first computing device, and a second storage device associated with the first computing device, wherein the second storage device is distinct from the one or more storage devices where the first backup data is stored. The above-recited method wherein the transmitting to the first index is at a first time, and wherein the transmitting to the second index is at a second time after a storage operation that generated the first backup data has completed. The above-recited method wherein the first media agent is configured to choose between the first index and the second index based on a type of data source being backed up. The above-recited method wherein a storage manager instructs the first media agent to transmit the first log files to the first index and to transmit the second log files to the second index based on one or more preferences that govern a choice of index to be used for a type of data source coincident with the first data source.

The above-recited method wherein a first data agent that transmits data to the first media agent for generating the first backup data instructs the first media agent to transmit the first log files to the first index; and wherein a second data agent that transmits data to the first media agent for generating the second backup data instructs the first media agent to transmit the second log files to the second index. The above-recited method further comprising: by a storage manager, determining whether to direct a search for one or more objects in backup data to the first index or to the second index. The above-recited method further comprising: migrating the first index from a second computing device to a third computing device, wherein an association between the first backup data and the first index is updated to indicate that the first index resides at the third computing device. The above-recited method further comprising: by a storage manager comprising one or more hardware processors, determining that one or more criteria for migration are met by the first computing device; and by the storage manager, causing the first index to migrate from the first computing device to a second computing device, wherein an association between the first backup data and the first index is updated to indicate that the first index resides at the second computing device. The above-recited method further comprising: migrating the first media agent from the first computing device to a second computing device, wherein an association between the first backup data and the first media agent is updated to indicate that the first media agent resides at the second computing device; and by the first media agent, restoring an individual data file from the first backup data based on using the first index at the second computing device.

According to another illustrative embodiment, a system comprises: a first computing device comprising one or more hardware processors and computer memory; a second computing device comprising one or more hardware processors and computer memory; wherein the first computing device is configured to: at a first time, perform a first backup operation that generates first backup data from a first data source, store the first backup data to one or more storage devices that are communicatively coupled to the first computing device, generate first log files based on the first backup operation, wherein the first log files comprise information for locating the first backup data at the one or more storage devices, and store the first log files to at least one of: the first computing device, and the one or more storage devices that store the first backup data, and at a second time, after the first backup operation completes, transmit the first log files to a first index for keeping track of backup data generated by at least the first computing device, including the first backup data; and wherein the second computing device is configured to update the first index by applying the first log files to the first index, and is further configured to, at a third time after applying the first log files to the first index, cause the first index to be backed up to a backup index.

The above-recited system further comprising: wherein the first index is one of a plurality of indexes in the system, and wherein each index in the plurality is maintained by a respective indexing module using a respective type of indexing technology, and wherein each indexing module is associated with one or more data sources. The above-recited system further comprising: wherein the first index is one of a plurality of indexes in the system that are stored at the second computing device, and wherein each index in the plurality is maintained by a respective indexing module that executes at the second computing device and uses a respective type of indexing technology that is associated with one or more types of data sources in the system. The above-recited system further comprising: a third computing device comprising one or more hardware processors and computer memory, wherein the third computing device is configured to: determine that one or more criteria for migration are met by the second computing device that comprises the first index, based at least in part on an amount of storage space occupied by the first index, and cause the first index to migrate from the second computing device to a fourth computing device, wherein an association between the first backup data and the first index is updated to indicate that the first index resides at the second computing device. The above-recited system wherein the first index is generated using a first indexing technology; and wherein the first computing device is further configured to: transmit second log files to a second index which is generated using a second indexing technology, wherein the second log files are based on generating second backup data from a second data source, wherein the second indexing technology is associated with the second data source, and wherein the second index is updated by applying the second log files to the second index. The above-recited system further comprising: a third computing device comprising one or more hardware processors and computer memory, wherein the third computing device is configured to: instruct the first computing device to transmit the first log files to the first index based preferences that govern a choice of index to be used for a first type of data source coincident with the first data source, and instruct the first computing device to transmit second log files to a second index generated from backing up a second data source a second type that differs from the first type of the first data source, based on preferences that govern a choice of index to be used for the second type of data source.

According to yet another illustrative embodiment, a method comprises: by a storage manager, initiating a first backup operation with a first media agent, wherein the first media agent receives instructions from the storage manager, wherein the first media agent executes on a first computing device comprising one or more hardware processors, and wherein the storage manager executes on a second computing device, distinct from the first computing device, and comprising one or more hardware processors; in response to instructions, performing a first backup operation by the first media agent at a first time, wherein the backup operation generates first backup data from a first data source and causes the first backup data to be stored to one or more storage devices that are communicatively coupled to the first media agent; by the first media agent, generating one or more log files based on the first backup operation, and storing the one or more log files to at least one of: the first computing device, and the one or more storage devices that store the first backup data; by the first media agent, at a second time after the first backup operation completes, transmitting the one or more log files to a first index, wherein the one or more log files comprise information about the first backup data, and wherein the first index is configured to enable restoring a plurality of backup data generated by at least the first media agent, including the first backup data; and wherein the index resides on a third computing device that is distinct from the first computing device and comprises one or more hardware processors, and wherein the first index is kept up-to-date by applying the one or more log files to the first index by the storage manager, determining that one or more criteria for migration are met by the third computing device; by the storage manager, causing the first index to migrate from the third computing device to a fourth computing device, wherein an association between the first data source and the first index is updated to indicate that the first index resides at the fourth computing device. The above-recited method wherein the one or more criteria for migration are based on an amount of cache storage space occupied by the first index at the third computing device.

The above-recited method wherein the first index is one of a first plurality of indexes maintained at the third computing device using ctree indexing technology, and wherein after the first index migrates to the fourth computing device, at least one other of the first plurality of indexes remains at the third computing device and is maintained thereon by the ctree indexing technology, and wherein the first index is maintained at the fourth computing device by ctree indexing technology that executes at the fourth computing device. The above-recited method wherein rules for determining which type of index/catalog tracks a given data source favor choosing solr technology (alternatively, elasticsearch) for data sources that are relatively rich in metadata; when the data source is a file system or network attached storage, which is relatively metadata-poor compared to the above-mentioned sources, the illustrative rules favor choosing ctree indexing technology; and when the data source is a structured database (e.g., managed by a database management system, such as an Oracle database), the rules favor SQL database technology or the like. The above-recited method wherein file system data from a first source device is assigned to a first ctree index/catalog at the third computing device, whereas database data from the first source is assigned to an SQL index/catalog on the third computing device or on the fourth computing device.

In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Embodiments of the invention are also described above with reference to flow chart illustrations and/or block diagrams of methods, apparatus (systems) and computer program products. It will be understood that each block of the flow chart illustrations and/or block diagrams, and combinations of blocks in the flow chart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments of the inventions have been described, these embodiments have been presented by way of example only and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

Terminology. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method comprising:
   by a first media agent hosted by a first computing device, generating first backup data from a first data source, wherein the first computing device comprises one or more hardware processors;

by the first media agent, storing the first backup data to one or more storage devices that are communicatively coupled to the first media agent;

by the first media agent, generating one or more first log files, wherein the one or more first log files are based on one or more of: the generating of the first backup data and the storing of the first backup data, and wherein the one or more first log files comprise information for locating the first backup data at the one or more storage devices;

by the first media agent, transmitting the one or more first log files to a first index that is configured to enable restoring backup files generated by at least the first media agent, including restoring first backup files selected from the first backup data, wherein the first index is updated based on information in the one or more first log files, and wherein the first index is based on a first type of indexing technology, which is associated with the first data source based on a first type of data of the first data source;

by the first media agent, generating second backup data from a second data source of a second type of data, wherein the second type of data is distinct from the first type of data, and further generating second log files based on one or more of: the generating of the second backup data and storing of the second backup data; and by the first media agent, transmitting the second log files to a second index that is based on a second type of indexing technology that differs from the first type of indexing technology, wherein the second type of indexing technology is associated with the second data source based on the second type of data of the second data source, and wherein the second index is updated based on information in the second log files; and migrating the first index from a second computing device to a third computing device, wherein an association between the first backup data and the first index is updated to indicate that the first index resides at the third computing device, wherein the second computing device comprises one or more hardware processors, and wherein the third computing device comprises one or more hardware processors.

2. The computer-implemented method of claim 1 further comprising:

migrating the first media agent from the first computing device to an other computing device that comprises one or more hardware processors, wherein an association between the first backup data and the first media agent is updated to indicate that the first media agent resides at the other computing device; and by the first media agent hosted by the other computing device, restoring an individual data file selected from the first backup data based on using the first index.

3. The computer-implemented method of claim 1, wherein the first index is backed up when index-backup criteria are met that are distinct from a timeframe for the generating of the first backup data.

4. The computer-implemented method of claim 1 further comprising:

by the first media agent, storing the one or more first log files to at least one of: the first computing device, and a second storage device associated with the first computing device, wherein the second storage device is distinct from the one or more storage devices where the first backup data is stored.

5. The computer-implemented method of claim 1, wherein the one or more first log files are transmitted to the first index after a storage operation that generated the first backup data has completed.

6. The computer-implemented method of claim 1, wherein before the migrating, the first index is maintained by the second computing device, which is distinct from the first computing device, and wherein the first index is one of a first plurality of indexes maintained by the second computing device using the first type of indexing technology, which comprises ctree indexing technology, and wherein the first plurality of indexes does not include the second index; and wherein after a migrating the first index to the third computing device, at least one other of the first plurality of indexes remains at the second computing device and is maintained thereon by the ctree indexing technology; and wherein at the third computing device, the first index is maintained by a ctree indexing technology that is hosted by the third computing device.

7. The computer-implemented method of claim 1, further comprising: receiving, by the first media agent, one or more rules that associate the first type of indexing technology with one or more of: the first type of data and the first data source.

8. The computer-implemented method of claim 1, wherein the first media agent is configured to choose between the first index and the second index based on a type of data source being backed up.

9. The computer-implemented method of claim 1, wherein a storage manager instructs the first media agent to transmit the one or more first log files to the first index and to transmit the second log files to the second index based on one or more preferences that govern a choice of index, and wherein the storage manager comprises one or more hardware processors.

10. The computer-implemented method of claim 1, wherein a first data agent that transmits data to the first media agent for generating the first backup data instructs the first media agent to transmit the one or more first log files to the first index; and wherein a second data agent that transmits data to the first media agent for generating the second backup data instructs the first media agent to transmit the second log files to the second index.

11. A storage system comprising:

a first computing device comprising one or more hardware processors and computer memory;

a second computing device comprising one or more hardware processors and computer memory;

wherein the first computing device is configured to:
at a first time, perform a first backup operation that generates first backup data from a first data source, stores the first backup data to one or more storage devices that are communicatively coupled to the first computing device, and generates first log files, and at a second time after the first time, transmit the first log files to a first index that tracks backup data generated by at least the first computing device, including the first backup data; and wherein the second computing device is configured to:
use a first indexing technology to update the first index based on information in the first log files, at a third time, after updating the first index, cause the first index to be backed up to a backup index, receive second log files from the first computing device, wherein the second log files are based on generating second backup data from a second data source, use a second indexing technology, distinct from the first indexing technology, to update a second index based on information in the second log files, and migrate the first index to a third computing device, wherein an association between the first backup data and the first index is updated to indicate that the first index resides at the third computing device, and wherein the third computing device comprises one or more hardware processors and computer memory.

12. The storage system of claim 11, wherein the second time is after the first backup operation completes.

13. The storage system of claim 11, wherein the first index is backed up when index-backup criteria are met that are distinct from a timeframe for performing the first backup operation.

14. The storage system of claim 11, wherein the first index is one of a plurality of indexes in the storage system, and
wherein each index in the plurality of indexes is maintained by a respective indexing module using a respective type of indexing technology, and
wherein each indexing module is associated with one or more data sources.

15. The storage system of claim 11 further comprising:
an other computing device comprising one or more hardware processors and computer memory, wherein the other computing device is configured to:
determine that one or more criteria for migration are met at the second computing device that comprises the first index, based at least in part on an amount of storage space occupied by the first index, and
cause the first index to migrate from the second computing device to the third computing device.

16. The storage system of claim 11, wherein the first index is one of a first plurality of indexes maintained by the second computing device using the first indexing technology, which comprises ctree indexing technology, and wherein the first plurality of indexes does not include the second index; and
wherein after the first index migrates to the third computing device, at least one other of the first plurality of indexes remains at the second computing device and is maintained thereon by the ctree indexing technology; and
wherein the first index is maintained by the third computing device using a ctree indexing technology that is hosted by the third computing device.

17. The storage system of claim 11, wherein the first computing device is further configured to: receive one or more rules that associate the first indexing technology with the first data source.

18. The storage system of claim 11 wherein preferences in the storage system govern a choice of index based on a type of data source, and further comprising:
a fourth computing device comprising one or more hardware processors and computer memory, wherein the fourth computing device is configured to:
instruct the first computing device to transmit the first log files to the first index based on the preferences that govern the choice of index for the first data source, and
instruct the first computing device to transmit the second log files to the second index based on backing up the second data source,
wherein the first data source is of a different type from the second data source,
wherein the first index is of a first type associated with the first data source, and
wherein the second index is of a second type associated with the second data source.

19. The storage system of claim 11, wherein one of the second computing device and the third computing device is further configured to: restore an individual data file selected from the first backup data based on using the first index.

* * * * *